(12) United States Patent
Wang et al.

(10) Patent No.: US 12,568,367 B2
(45) Date of Patent: Mar. 3, 2026

(54) ROUTING INDICATOR RETRIVAL FOR AKMA

(71) Applicant: Telefonaktiebolaget LM Ericsson (publ), Stockholm (SE)

(72) Inventors: Cheng Wang, Shanghai (CN); David Castellanos Zamora, Madrid (ES); Vlasios Tsiatsis, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 238 days.

(21) Appl. No.: 18/273,870

(22) PCT Filed: Nov. 11, 2021

(86) PCT No.: PCT/EP2021/081371
§ 371 (c)(1),
(2) Date: Jul. 24, 2023

(87) PCT Pub. No.: WO2022/156933
PCT Pub. Date: Jul. 28, 2022

(65) Prior Publication Data

US 2024/0080664 A1     Mar. 7, 2024

(30) Foreign Application Priority Data

Jan. 22, 2021    (WO) ................ PCT/CN2021/073180

(51) Int. Cl.
| | |
|---|---|
| *H04L 29/00* | (2006.01) |
| *H04W 12/0433* | (2021.01) |
| *H04W 12/06* | (2021.01) |
| *H04W 12/72* | (2021.01) |

(52) U.S. Cl.
CPC ....... *H04W 12/06* (2013.01); *H04W 12/0433* (2021.01); *H04W 12/72* (2021.01)

(58) Field of Classification Search
CPC .. H04W 12/06; H04W 12/72; H04W 12/0433
USPC .......................................................... 726/6
See application file for complete search history.

(56) References Cited

FOREIGN PATENT DOCUMENTS

| WO | WO-2020005925 A1 * | 1/2020 | ......... H04L 61/5069 |
| WO | WO-2020095938 A1 * | 5/2020 | ............ H04W 12/02 |

OTHER PUBLICATIONS

3GPP TS 23.003 V17.0.0, "3rd Generation Partnership Project; Technical Specification Group Core Network and Terminals; Numbering, addressing and identification; (Release 17)", Dec. 2020.

(Continued)

*Primary Examiner* — Brandon Hoffman
*Assistant Examiner* — Michael D Anderson
(74) *Attorney, Agent, or Firm* — Withrow & Terranova, PLLC

(57) ABSTRACT

A method for an authentication server function, AUSF, of a communication network is provided. The method comprises sending a second authentication request comprising a first identifier associated with a user equipment, UE, or a second identifier associated with the UE, receiving a response to the second authentication request, and when the response comprises an 5 authentication and key management for applications, AKMA, indicator: determining a first security key identifier based on a first field comprised in the response.

12 Claims, 14 Drawing Sheets

(56) References Cited

OTHER PUBLICATIONS

3GPP TS 33.501 V17.0.0, "3rd Generation Partnership Project; Technical Specification Group Services and System Aspects; Security architecture and procedures for 5G system", 3GPP TS 33.501 V17.0.0, Dec. 2020.

3GPP TS 33.535 V17.0.0, "3rd Generation Partnership Project; Technical Specification Group Services and System Aspects; Authentication and Key Management for Applications (AKMA) based on 3GPP credentials in the 5G System (5GS), (Release 17)", Dec. 2020.

3GPP TS 33.535 V17.3.0, 3rd Generation Partnership Project; Technical Specification Group Services and System Aspects; Authentication and Key Management for Applications (AKMA) based on 3GPP credentials in the 5G System (5GS) (Release 17), Sep. 2021.

Huawei, "Clarification on A-KID generation", 3GPP TSG-SA3 Meeting, S3-210253, e-meeting, Jan. 18-29, 2021, online.

Huawei et al., "Clarification on AAnF Selection", 3GPP TSG-SA3 Meeting #102-e, S3-210254, e-meeting, Jan. 18-29, 2021, Online.

* cited by examiner

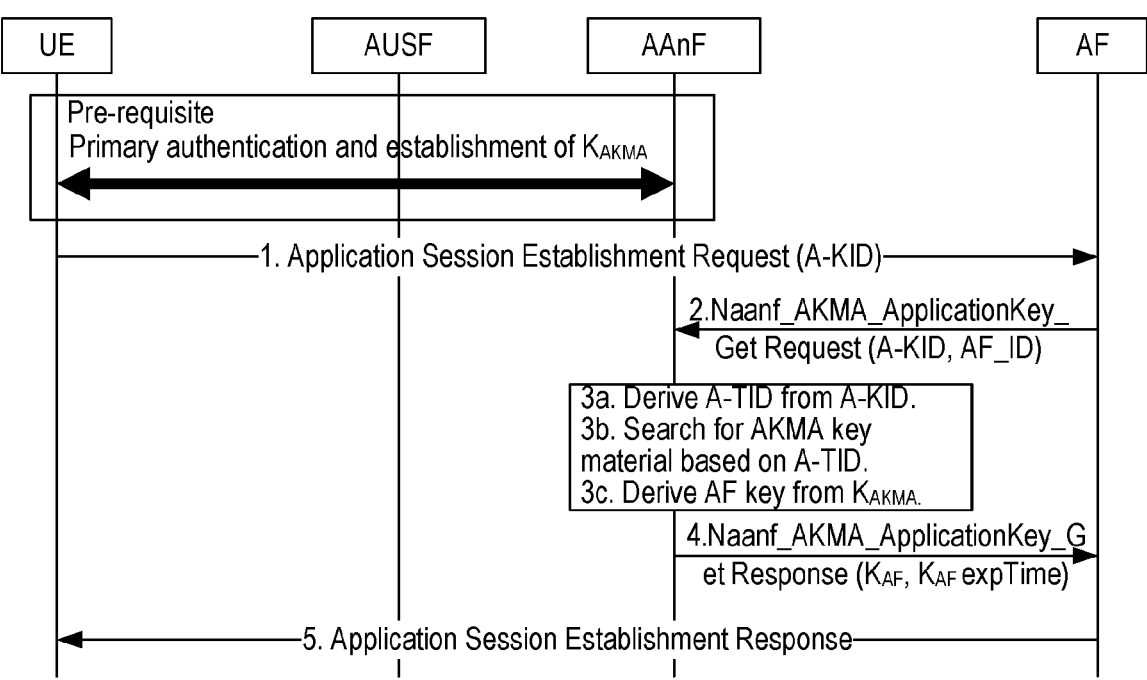

FIG. 11

| | |
|---|---|
| Receiving, from a user equipment (UE), an authentication request that includes either a first identifier associated with the UE or a second identifier associated with the UE. | 1210 |

| | |
|---|---|
| Determining a first security key identifier based on a first field obtained from a unified data management function (UDM) of the communication network. | 1220 |
| Determining a third identifier associated with the UE based on the second identifier. | 1221 |
| sending, to the UDM, an authentication request that includes the third identifier. | 1222 |
| Receiving the first field from the UDM in response to the authentication request. | 1223 |

| | |
|---|---|
| Determining the first security key identifier based on a first field included in the first identifier. | 1230 |

| | |
|---|---|
| Sending, to the UDM, the first field included in the first identifier. | 1240 |

| | |
|---|---|
| Determining a second security key identifier that is not based on the first field | 1250 |

| | |
|---|---|
| Deriving an anchor key ($K_{AKMA}$) for the UE. | 1260 |

| | |
|---|---|
| Sending, to an anchor function for authentication and key management for applications (AAnF) of the communication network, a message including the anchor key ($K_{AKMA}$) and the determined security key identifier. | 1270 |

FIG. 12A

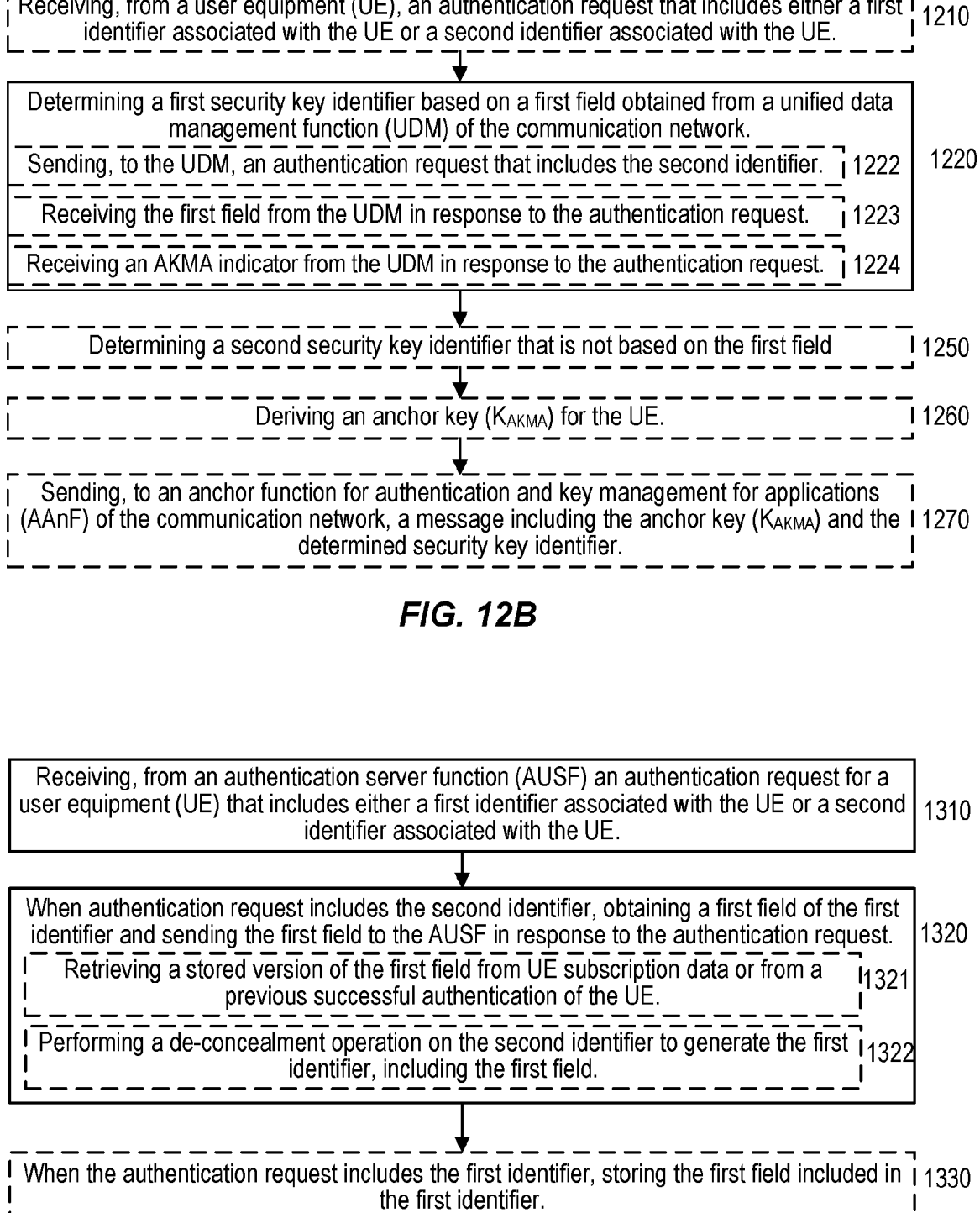

Receiving, from a user equipment (UE), an authentication request that includes either a first identifier associated with the UE or a second identifier associated with the UE.   1210

Determining a first security key identifier based on a first field obtained from a unified data management function (UDM) of the communication network.

Sending, to the UDM, an authentication request that includes the second identifier.   1222

Receiving the first field from the UDM in response to the authentication request.   1223

Receiving an AKMA indicator from the UDM in response to the authentication request.   1224

1220

Determining a second security key identifier that is not based on the first field   1250

Deriving an anchor key ($K_{AKMA}$) for the UE.   1260

Sending, to an anchor function for authentication and key management for applications (AAnF) of the communication network, a message including the anchor key ($K_{AKMA}$) and the determined security key identifier.   1270

FIG. 12B

Receiving, from an authentication server function (AUSF) an authentication request for a user equipment (UE) that includes either a first identifier associated with the UE or a second identifier associated with the UE.   1310

When authentication request includes the second identifier, obtaining a first field of the first identifier and sending the first field to the AUSF in response to the authentication request.

Retrieving a stored version of the first field from UE subscription data or from a previous successful authentication of the UE.   1321

Performing a de-concealment operation on the second identifier to generate the first identifier, including the first field.   1322

1320

When the authentication request includes the first identifier, storing the first field included in the first identifier.   1330

FIG. 13A

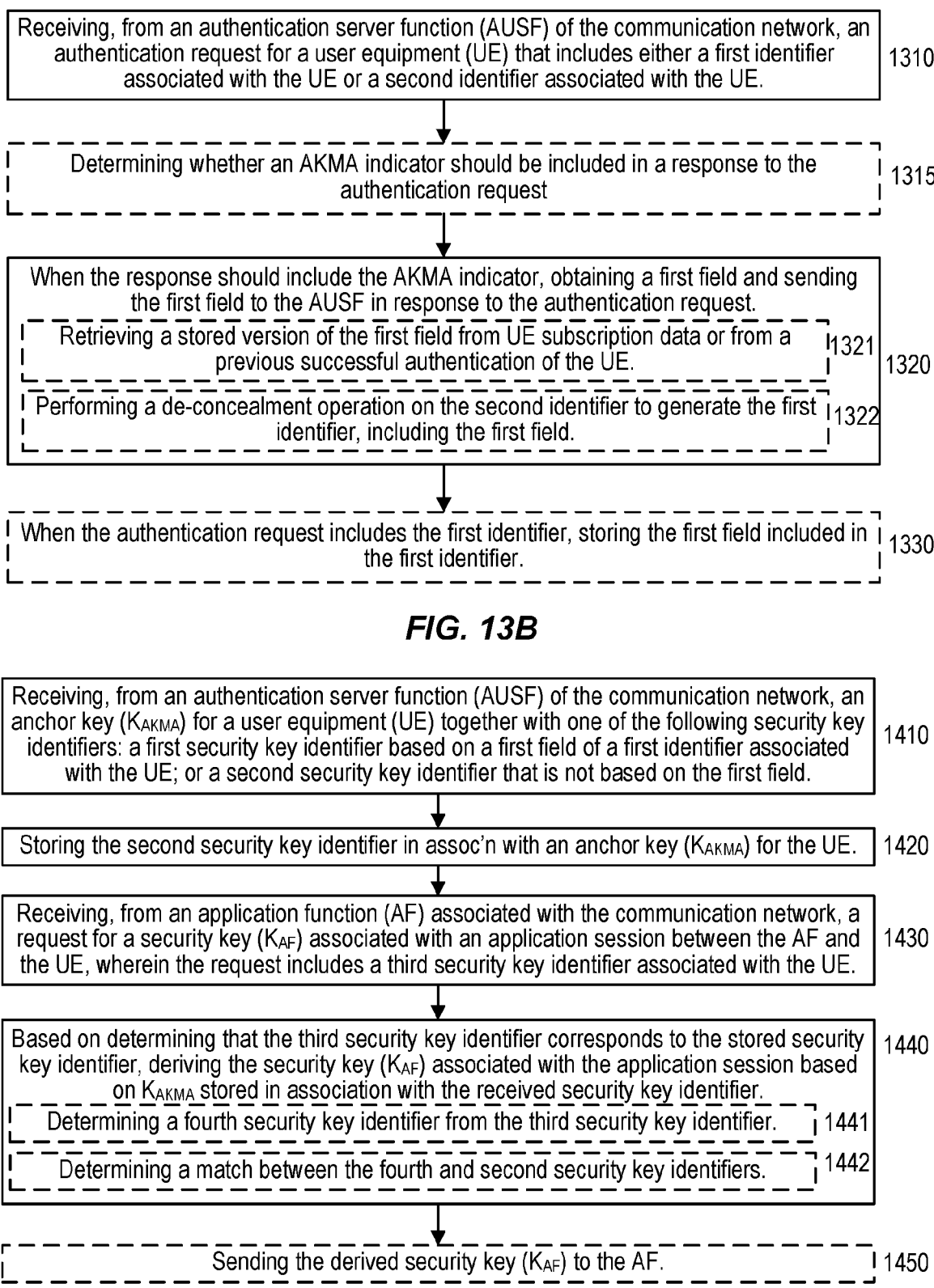

Receiving, from an authentication server function (AUSF) of the communication network, an authentication request for a user equipment (UE) that includes either a first identifier associated with the UE or a second identifier associated with the UE. — 1310

Determining whether an AKMA indicator should be included in a response to the authentication request — 1315

When the response should include the AKMA indicator, obtaining a first field and sending the first field to the AUSF in response to the authentication request. — 1320

Retrieving a stored version of the first field from UE subscription data or from a previous successful authentication of the UE. — 1321

Performing a de-concealment operation on the second identifier to generate the first identifier, including the first field. — 1322

When the authentication request includes the first identifier, storing the first field included in the first identifier. — 1330

FIG. 13B

Receiving, from an authentication server function (AUSF) of the communication network, an anchor key ($K_{AKMA}$) for a user equipment (UE) together with one of the following security key identifiers: a first security key identifier based on a first field of a first identifier associated with the UE; or a second security key identifier that is not based on the first field. — 1410

Storing the second security key identifier in assoc'n with an anchor key ($K_{AKMA}$) for the UE. — 1420

Receiving, from an application function (AF) associated with the communication network, a request for a security key ($K_{AF}$) associated with an application session between the AF and the UE, wherein the request includes a third security key identifier associated with the UE. — 1430

Based on determining that the third security key identifier corresponds to the stored security key identifier, deriving the security key ($K_{AF}$) associated with the application session based on $K_{AKMA}$ stored in association with the received security key identifier. — 1440

Determining a fourth security key identifier from the third security key identifier. — 1441

Determining a match between the fourth and second security key identifiers. — 1442

Sending the derived security key ($K_{AF}$) to the AF. — 1450

FIG. 14

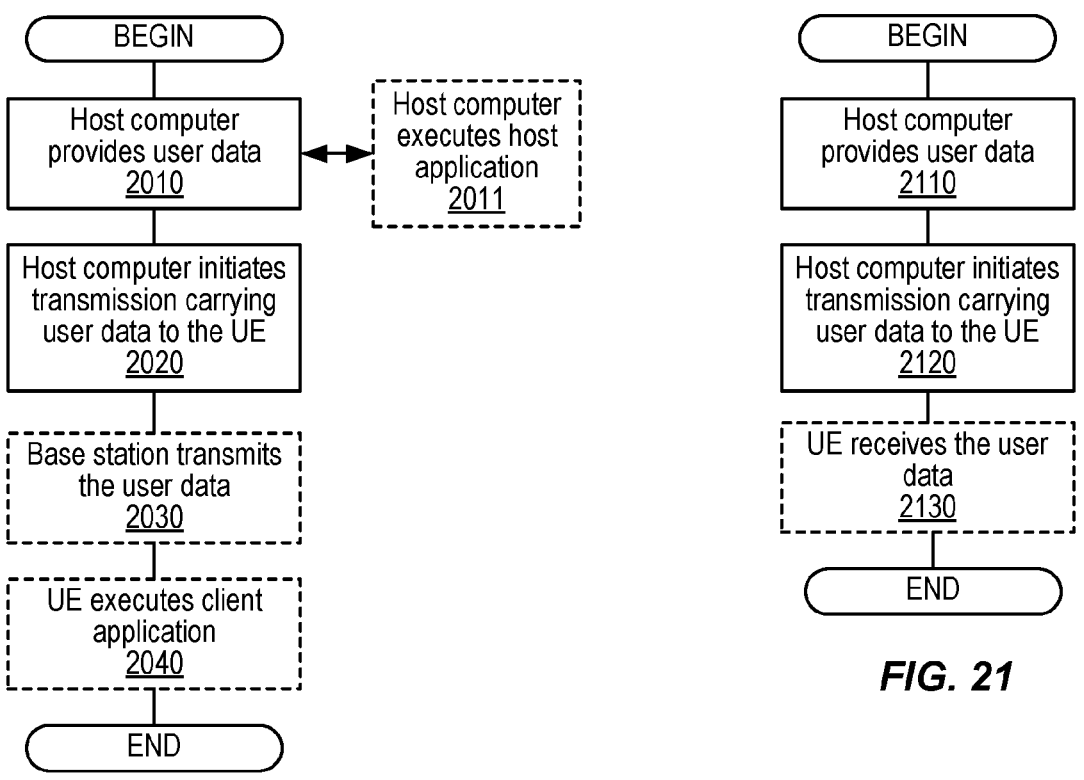
FIG. 20
FIG. 21
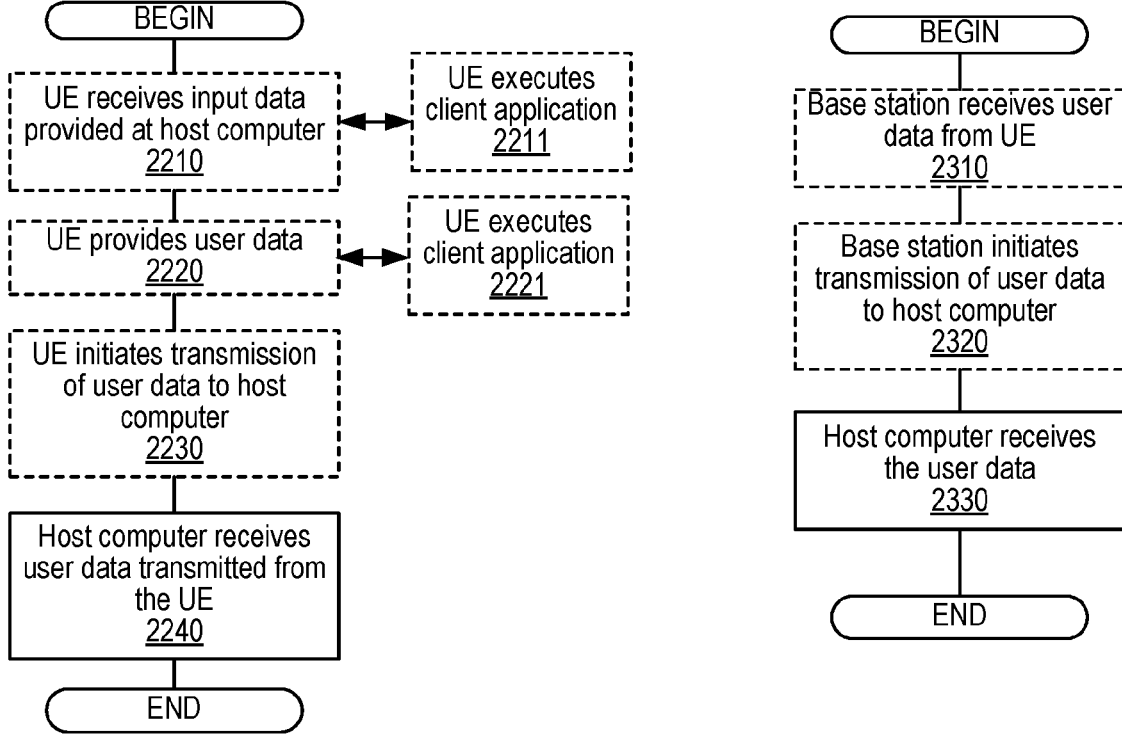
FIG. 22
FIG. 23

ROUTING INDICATOR RETRIVAL FOR AKMA

PRIORITY CLAIM

This application is a national stage application of International Patent Application No. PCT/EP2021/081371, filed Nov. 11, 2021, which claims priority to International Patent Application No. PCT/CN2021/073180, Jan. 22, 2021, the disclosure disclosures of which are hereby incorporated in their entirety by reference.

TECHNICAL FIELD

The present application relates generally to the field of wireless communication networks, and more specifically to improved techniques for secure communications between a user equipment (UE) and an application function (AF) in a communication network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. Besides the typical mobile broadband use case, also machine type communication (MTC), ultra-low latency critical communications (URLCC), side-link device-to-device (D2D), and several other use cases.

3GPP security working group SA3 specified the security-related features for Release 15 (Rel-15) of the 5G System (5GS) in 3GPP TS 33.501 (v15.11.0). In particular, the 5GS includes many new features (e.g., as compared to earlier 4G/LTE systems) that required introduction of new security mechanisms. For example, 5GS seamlessly integrates non-3GPP access (e.g., via wireless LAN) together with 3GPP access (e.g., NR and/or LTE). As such, in 5GS, a user equipment (UE, e.g., wireless device) can access services independent of underlying radio access technology (RAT).

3GPP Rel-16 introduces a new feature called authentication and key management for applications (AKMA) that is based on 3GPP user credentials in 5G, including the Internet of Things (IoT) use case. More specifically, AKMA leverages the user's Authentication and Key Agreement (AKA) credentials to bootstrap security between the UE and an application function (AF), which allows the UE to securely exchange data with an application server. The AKMA architecture can be considered an evolution of Generic Bootstrapping Architecture (GBA) specified for 5GC in Rel-15 and is further specified in 3GPP TS 33.535 (v.16.2.0).

As further defined in 3GPP TS 33.535 (v.16.2.0), the network and the UE derive an $K_{AKMA}$ key and an associated A-KID, as well as a $K_{AF}$ key. $K_{AF}$ is used to support of the security of the communication between the UE and an Application Function (AF), and A-KID is AKMA Key IDentifier of the root key (i.e., $K_{AKMA}$) that is used to derive $K_{AF}$. More specifically, A-KID includes an AKMA Temporary UE Identifier (A-TID) and routing information related to the UE's home network (HPLMN).

A Subscription Concealed Identifier (SUCI) is used in 5G networks to conceal and/or maintain the privacy of a user's Subscription Permanent Identifier (SUPI). The SUCI consists of various field, including a Routing Indicator assigned by the user's home network operator and provisioned in a USIM in the UE. When coupled with a Home Network Identifier included in the SUCI, the Routing Indicator facilitates routing of signalling to network functions (NFs) in the home network that can serve the user/subscriber.

The Routing Indicator is also necessary for generation of A-KID. However, there can be various scenarios in which the NF needing to generate A-KID during UE authentication does not have the UE's Routing Indicator, resulting in undesirable failure of AKMA procedures.

SUMMARY

Accordingly, exemplary embodiments of the present disclosure address these and other problems, issues, and/or difficulties associated with generating security keys for a UE in a 5G (or more generally, communication) network, thereby facilitating the otherwise-advantageous deployment of security features such as AKMA.

According to a first aspect, a method performed by an authentication server function, AUSF, of a communication network, is provided. The method may comprise sending a second authentication request comprising a first identifier associated with a user equipment, UE, or a second identifier associated with the UE, receiving a response to the second authentication request, and when the response comprises an authentication and key management for applications, AKMA, indicator: determining a first security key identifier based on a first field (RID) comprised in the response.

According to some embodiments, the method further comprises deriving an anchor key for the UE, and sending, to an anchor function for authentication and key management for applications, AAnF, a message including the anchor key and the first security key identifier. The message may in some embodiments further include the second identifier.

In some embodiments, the second authentication request is sent to a unified data management function, UDM, of the communication network, and the response to the second authentication request is received from the UDM.

In some embodiments, the first field corresponds to a field of the first identifier.

In some embodiments, the method further comprises sending, to the UDM, the second authentication request comprising the first identifier or the second identifier, and receiving the response comprising the first field from the UDM in response to the second authentication request, wherein the response comprises the AKMA indicator and the first field.

In some embodiments, the first identifier is a subscription concealed identifier, SUCI.

In some embodiments, the second identifier is a subscription permanent identifier, SUPI.

In some embodiments, the first field is a Routing Indicator, RID, associated with a home network of the UE.

In some embodiments, the first security key identifier is an authentication and key management for applications, AKMA, key identifier, A-KID.

According to a second aspect, a method performed by a unified data management function, UDM, of a communication network, is provided. The method may comprise receiving, from an authentication server function, AUSF, of the communication network, an authentication request for a user equipment, UE, that includes either a first identifier associated with the UE or a second identifier associated with the UE, obtaining a first field, and sending an authentication and key management for applications, AKMA, indicator and the first field to the AUSF in response to the authentication request.

In some embodiments, the method is further comprising determining if an AKMA indicator should be included in the response to the authentication request, and in response to the determination that the AKMA indicator should be included, sending an AKMA indicator and the first field to the AUSF in response to the authentication request.

In some embodiments, the method further comprises, when the authentication request includes the first identifier, storing the first field included in the first identifier.

In some embodiments, the obtaining of the first field comprises one of the following: retrieving a stored version of the first field from UE subscription data or from a previous successful authentication of the UE, or performing a de-concealment operation on the second identifier to generate the first identifier, including the first field.

In some embodiments, the second identifier is a subscription permanent identifier, SUPI.

In some embodiments, the first identifier is a subscription concealed identifier, SUCI.

In some embodiments, the first field is a Routing Indicator, RID, associated with a home network of the UE.

According to a third aspect, a method performed by an anchor function for authentication and key management for applications, AAnF, of a communication network is provided. The method may comprise receiving, from an authentication server function, AUSF, of the communication network, an anchor key for a user equipment, UE, and a first security key identifier based on a first field of a first identifier associated with the UE, and storing the anchor key in association with the first security key identifier. The method may further comprise receiving, from an application function, AF, associated with the communication network, a request for a security key associated with an application session between the AF and the UE, wherein the request includes a third security key identifier associated with the UE, and based on determining that the third security key identifier corresponds to the stored first security key identifier, deriving the security key associated with the application session based on the anchor key stored in association with the received third security key identifier.

In some embodiments, the method is further comprising sending the derived security key to the AF.

In some embodiments, the second identifier is a subscription permanent identifier, SUPI.

In some embodiments, the first identifier is a subscription concealed identifier, SUCI.

In some embodiments, the first field is a Routing Indicator, RID, associated with a home network of the UE.

In some embodiments, the first security key identifier is an authentication and key management for applications, AKMA, key identifier, A-KID.

According to a fourth aspect, an authentication server function, AUSF, of a communication network is provided. The AUSF comprises interface circuitry configured to communicate with a user equipment, UE, and with an anchor function for authentication and key management for applications, AAnF, and a unified data management function, UDM, of the communication network, and processing circuitry operably coupled to the interface circuitry, whereby the processing circuitry and interface circuitry are configured to perform operations corresponding to any of the methods of the first aspect.

An authentication server function, AUSF, of a communication network is provided. The AUSF is configured to perform operations corresponding to any of the methods of the first aspect.

A non-transitory, computer-readable medium storing computer-executable instructions is provided, that, when executed by processing circuitry associated with an authentication server function, AUSF, of a communication network, configure the AUSF to perform operations corresponding to any of the methods of the first aspect.

A computer program is provided, the computer program comprising instructions which, when the program is executed by a computer, cause the computer to carry out the steps of any of the methods of the first aspect.

A computer program product comprising computer-executable instructions is provided, that, when executed by processing circuitry associated with an authentication server function, AUSF, of a communication network, configure the AUSF to perform operations corresponding to any of the methods of the first aspect.

According to a fifth aspect, a unified data management function, UDM, of a communication network is provided. The UDM comprises interface circuitry configured to communicate with an authentication server function, AUSF, of the communication network, and processing circuitry operably coupled to the interface circuitry, whereby the processing circuitry and interface circuitry are configured to perform operations corresponding to any of the methods of the second aspect.

A unified data management function, UDM, of a communication network is provided. The UDM is configured to perform operations corresponding to any of the methods of the second aspect.

A non-transitory, computer-readable medium storing computer-executable instructions is provided, that, when executed by processing circuitry associated with a unified data management function, UDM, of a communication network, configure the UDM to perform operations corresponding to any of the methods of the second aspect.

A computer program is provided, the computer program comprising instructions which, when the program is executed by a computer, cause the computer to carry out the steps of any of the methods of the second aspect.

A computer program product comprising computer-executable instructions that, when executed by processing circuitry associated with a unified data management function, UDM, of a communication network, configure the UDM to perform operations corresponding to any of the methods of the second aspect.

According to a sixth aspect, an anchor function for authentication and key management for applications, AAnF, of a communication network is provided. The AAnF comprises interface circuitry configured to communicate with a user equipment, UE, and with an authentication server function, AUSF, of the communication network, and processing circuitry operably coupled to the interface circuitry, whereby the processing circuitry and interface circuitry are configured to perform operations corresponding to any of the methods of the third aspect.

An anchor function for authentication and key management for applications, AAnF, in a communication network is provided. The AAnF is configured to perform operations corresponding to any of the methods of the third aspect.

A non-transitory, computer-readable medium storing computer-executable instructions is provided, that, when executed by processing circuitry associated with an anchor function for authentication and key management for applications, AAnF, in a communication network, configure the AAnF to perform operations corresponding to any of the methods of the third aspect.

A computer program is provided, the computer program comprising instructions which, when the program is executed by a computer, cause the computer to carry out the steps of any of the methods of the third aspect.

A computer program product comprising computer-executable instructions is provided, that, when executed by processing circuitry associated with an anchor function for authentication and key management for applications, AAnF, in a communication network, configure the AAnF to perform operations corresponding to any of the methods of embodiments the third aspect.

Some embodiments include exemplary methods (e.g., procedures) for an authentication server function (AUSF) of a communication network (e.g., 5GC).

These exemplary methods can include receiving, from a user equipment (UE), an authentication request that includes either a first identifier associated with the UE or a second identifier associated with the UE. When the authentication request includes the second identifier, these exemplary methods can also include one of the following: determining a first security key identifier based on a first field, of the first identifier, that is obtained from a unified data management function (UDM) of the communication network; or determining a second security key identifier that is not based on a first field of the first identifier and send, to the UDM, the first field included in the first identifier.

In some embodiments, when the authentication request includes the first identifier, these exemplary methods can also include the operations of blocks 1230-1240, where the AUSF can determine the first security key identifier based on a first field included in the first identifier and sending, to the UDM, the first field included in the first identifier.

In some embodiments, the second identifier can be a 5G Global Unique Temporary Identifier (5G-GUTI), the first identifier can be a subscription concealed identifier (SUCI), and the first field can be a Routing Indicator (RID) associated with a home network of the UE. In such embodiments, the first security key identifier can be an authentication and key management for applications (AKMA) key identifier (A-KID) and the second security key identifier can be an AKMA Temporary UE Identifier (A-TID).

In some embodiments, determining the first security key identifier based on the first field obtained from the UDM can include: determining a third identifier associated with the UE based on the second identifier; sending, to the UDM, an authentication request that includes the third identifier; and receiving the first field from the UDM in response to the authentication request. In some of these embodiments, the authentication request can include an explicit request for the first field. In some of these embodiments, the third identifier can be a subscription permanent identifier (SUPI).

In some embodiments, these exemplary methods can also include deriving an anchor key ($K_{AKMA}$) for the UE and sending, to an authentication and key management for applications (AAnF) of the communication network, a message including the anchor key ($K_{AKMA}$) and the determined security key identifier. In some embodiments, the message can also include an indication of whether the included security key identifier is the first security key identifier or the second security key identifier (e.g., a key identifier type indicator).

In some embodiments, determining the second security key identifier can be further based on a determination that the first field of the first identifier associated with the UE is unavailable to the AUSF.

Other embodiments include exemplary methods (e.g., procedures) for a unified data management function (UDM) of a communication network (e.g., 5GC).

These exemplary methods can include receiving, from an AUSF of the communication network, an authentication request for a UE that includes either a first identifier associated with the UE or a second identifier associated with the UE. When the authentication request includes the second identifier, these exemplary methods can also include obtaining a first field of the first identifier and sending the first field to the AUSF in response to the authentication request. When the authentication request includes the first identifier, these exemplary methods can also include storing the first field included in the first identifier.

In some embodiments, obtaining the first field can include one of the following: retrieving a stored version of the first field from UE subscription data or from a previous successful authentication of the UE; or performing a de-concealment operation on the second identifier to generate the first identifier, including the first field.

In some embodiments, sending the first field to the AUSF can be responsive to one of the following: an explicit request for the first field, included in the authentication request; or inclusion of an AKMA indicator in the response to the authentication request.

In some embodiments, the second identifier can be a 5G Global Unique Temporary Identifier (5G-GUTI), the first identifier can be a subscription concealed identifier (SUCI), and the first field can be a Routing Indicator (RID) associated with a home network of the UE.

Other embodiments include exemplary methods (e.g., procedures) an anchor function for an authentication and key management for applications (AAnF) of a communication network (e.g., 5GC).

These exemplary methods can include receiving, from an authentication server function (AUSF) of the communication network, an anchor key ($K_{AKMA}$) for a user equipment (UE) together with one of the following security key identifiers:

a first security key identifier based on a first field of a first identifier associated with the UE; or a second security key identifier that is not based on the first field.

These exemplary methods can also include storing the anchor key ($K_{AKMA}$) in association with received security key identifier. These exemplary methods can also include receiving, from an application function (AF) associated with the communication network, a request for a security key ($K_{AF}$) associated with an application session between the AF and the UE. The request can include a third security key identifier associated with the UE. These exemplary methods can also include, based on determining that the third security key identifier corresponds to the stored to security key identifier, deriving the security key ($K_{AF}$) associated with the application session based on the anchor key ($K_{AKMA}$) stored in association with the received security key identifier. In some embodiments, these exemplary methods can also include sending the derived security key ($K_{AF}$) to the AF.

In some embodiments, the second identifier can be a subscription permanent identifier (SUPI), the first identifier can be a subscription concealed identifier (SUCI), and the first field can be a Routing Indicator (RID) associated with a home network of the UE. In such embodiments, the first security key identifier can be an authentication and key management for applications (AKMA) key identifier (A-KID) and the second security key identifier can be an AKMA Temporary UE Identifier (A-TID).

In some embodiments, when the anchor key ($K_{AKMA}$) is stored in association with the second security key identifier, determining that the third security key identifier corresponds to the stored security key identifier can include: determining a fourth security key identifier from the received third security key identifier; and determining a match between the fourth security key identifier and the second security key identifier. In some embodiments, the third security key identifier can be an authentication and key management for applications (AKMA) key identifier (A-KID) and the fourth security key identifier can be an AKMA Temporary UE Identifier (A-TA).

Other embodiments include AUSFs, UDMs, and AAnFs (or network nodes hosting the same) that are configured to perform the operations corresponding to any of the exemplary methods described herein. Other embodiments include non-transitory, computer-readable media storing computer-executable instructions that, when executed by processing circuitry, configure such AUSFs, UDMs, and AAnFs to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIGS. 8-11 show signal flow diagrams of various exemplary security key generation procedures, according to various embodiments of the present disclosure.

FIGS. 12A and 12B illustrate exemplary methods (e.g., procedures) for an authentication server function (AUSF) of a communication network, according to various exemplary embodiments of the present disclosure.

FIGS. 13A and 13B illustrate exemplary methods (e.g., procedures) for a unified data management function (UDM) of a communication network, according to various exemplary embodiments of the present disclosure.

FIG. 14 illustrates an exemplary method (e.g., procedure) for an anchor function for authentication and key management for applications (AAnF) of a communication network, according to various exemplary embodiments of the present disclosure.

FIGS. 20-23 are flow diagrams of exemplary methods (e.g., procedures) for transmission and/or reception of user data, according to various exemplary embodiments of the present disclosure.

DETAILED DESCRIPTION

Figure 1:
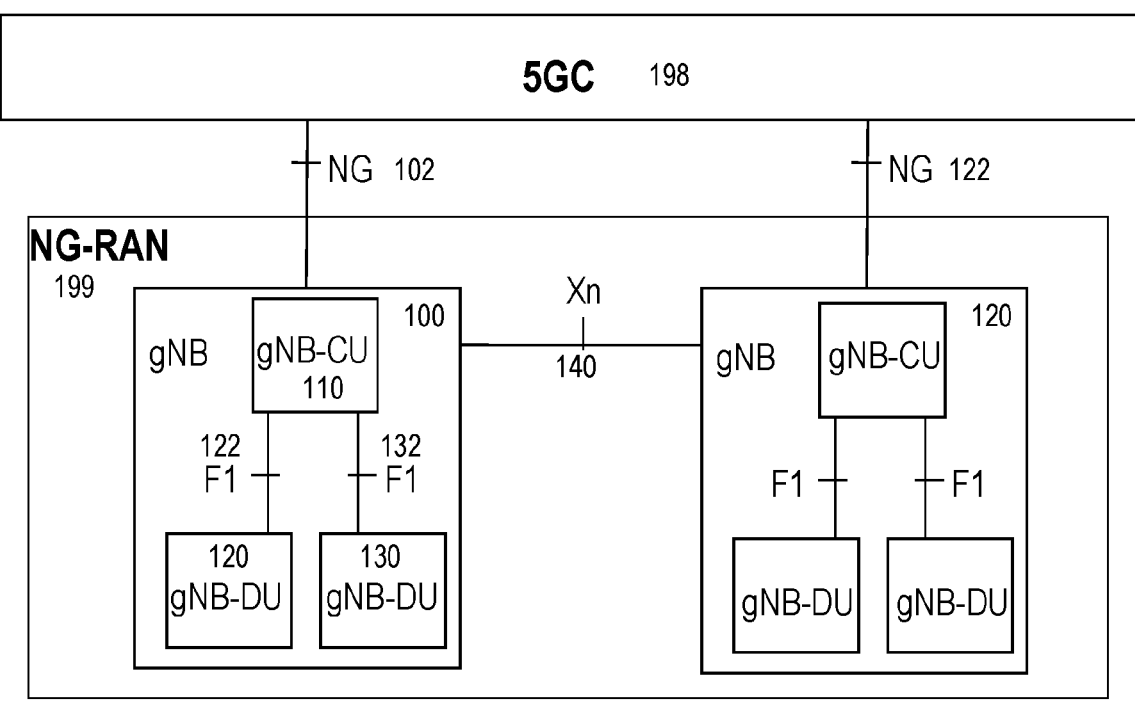
FIGS. 1-2 illustrate various aspects of an exemplary 5G network architecture.

Exemplary embodiments briefly summarized above will now be described more fully with reference to the accompanying drawings. These descriptions are provided by way of example to explain the subject matter to those skilled in the art and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features and advantages of the disclosed embodiments will be apparent from the following description.

Furthermore, the following terms are used throughout the description given below:

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node (or component thereof such as MT or DU), a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), etc. A core network node can also be a node that implements a particular core network function (NF), such as an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, mobile terminals (MTs), etc.

Radio Node: As used herein, a "radio node" can be either a "radio access node" (or equivalent term) or a "wireless device."

Network Node: As used herein, a "network node" is any node that is either part of the radio access network (e.g., a radio access node or equivalent term) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Node: As used herein, the term "node" (without any prefix) can be any type of node that is capable of operating in or with a wireless network (including a RAN and/or a core network), including a radio access node (or equivalent term), core network node, or wireless device.

Service: As used herein, the term "service" refers generally to a set of data, associated with one or more applications, that is to be transferred via a network with certain specific delivery requirements that need to be fulfilled in order to make the applications successful.

Component: As used herein, the term "component" refers generally to any component needed for the delivery of a service. Examples of component are RANs (e.g., E-UTRAN, NG-RAN, or portions thereof such as eNBs, gNBs, base stations (BS), etc.), CNs (e.g., EPC, 5GC, or portions thereof, including all type of links between RAN and CN entities), and cloud infrastructure with related resources such as computation, storage. In general, each component can have a "manager", which is an entity that can collect historical information about utilization of resources as well as provide information about the current and the predicted future availability of resources associated with that component (e.g., a RAN manager).

Note that the description given herein focuses on a 3GPP cellular communications system and, as such, 3GPP terminology or terminology similar to 3GPP terminology is generally used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

At a high level, the 5G System (5GS) consists of an Access Network (AN) and a Core Network (CN). The AN provides UEs connectivity to the CN, e.g., via base stations such as gNBs or ng-eNBs described below. The CN includes a variety of Network Functions (NF) that provide a wide range of different functionalities such as session management, connection management, charging, authentication, etc.

Communication links between the UE and a 5G network (AN and CN) can be grouped in two different strata. The UE communicates with the CN over the Non-Access Stratum (NAS), and with the AN over the Access Stratum (AS). All the NAS communication takes place between the UE and the AMF via the NAS protocol. Security for the communications over this these strata is provided by the NAS protocol (for NAS) and PDCP (for AS).

FIG. 1 illustrates a high-level view of an exemplary 5G network architecture, consisting of a Next Generation RAN (NG-RAN) 199 and a 5G Core (5GC) 198 NG-RAN 199 can include one or more gNodeB's (gNBs) connected to the 5GC via one or more NG interfaces, such as gNBs 100, 150 connected via interfaces 102, 152, respectively. More specifically, gNBs 100, 150 can be connected to one or more Access and Mobility Management Functions (AMFs) in the 5GC 198 via respective NG-C interfaces. Similarly, gNBs 100, 150 can be connected to one or more User Plane Functions (UPFs) in 5GC 198 via respective NG-U interfaces. Various other network functions (NFs) can be included in the 5GC 198, as described in more detail below.

In addition, the gNBs can be connected to each other via one or more Xn interfaces, such as Xn interface 140 between gNBs 100 and 150. The radio technology for the NG-RAN is often referred to as "New Radio" (NR). With respect the NR interface to UEs, each of the gNBs can support frequency division duplexing (FDD), time division duplexing (TDD), or a combination thereof. Each of the gNBs can serve a geographic coverage area including one more cells and, in some cases, can also use various directional beams to provide coverage in the respective cells.

NG-RAN 199 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region" which is defined in 3GPP TS 23.501 (v15.5.0). If security protection for CP and UP data on TNL of NG-RAN interfaces is supported, NDS/IP (3GPP TS 33.401 (v15.8.0) shall be applied.

The NG RAN logical nodes shown in FIG. 1 (and described in 3GPP TS 38.401 (v15.6.0) and 3GPP TR 38.801 (v14.0.0) include a Central Unit (CU or gNB-CU) and one or more Distributed Units (DU or gNB-DU). For example, gNB 100 includes gNB-CU 110 and gNB-DUs 120 and 130. CUs (e.g., gNB-CU 110) are logical nodes that host higher-layer protocols and perform various gNB functions such controlling the operation of DUs. A DU (e.g., gNB-DUs 120, 130) is a decentralized logical node that hosts lower layer protocols and can include, depending on the functional split option, various subsets of the gNB functions. As such, each of the CUs and DUs can include various circuitry needed to perform their respective functions, including processing circuitry, transceiver circuitry (e.g., for communication), and power supply circuitry.

A gNB-CU connects to one or more gNB-DUs over respective F1 logical interfaces, such as interfaces 122 and 132 shown in FIG. 1. However, a gNB-DU can be connected to only a single gNB-CU. The gNB-CU and connected gNB-DU(s) are only visible to other gNBs and the 5GC as a gNB. In other words, the F1 interface is not visible beyond gNB-CU.

Another change in 5GS (e.g., in 5GC) is that traditional peer-to-peer interfaces and protocols found in earlier-generation networks are modified and/or replaced by a Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services. This SBA model also adopts principles like modularity, reusability, and self-containment of NFs, which can enable deployments to take advantage of the latest virtualization and software technologies.

The services in 5GC can be stateless, such that the business logic and data context are separated. For example, the services can store their context externally in a proprietary database. This can facilitate various cloud infrastructure features like auto-scaling or auto-healing. Furthermore, 5GC services can be composed of various "service operations", which are more granular divisions of overall service functionality. The interactions between service consumers and producers can be of the type "request/response" or "subscribe/notify".

Figure 2:
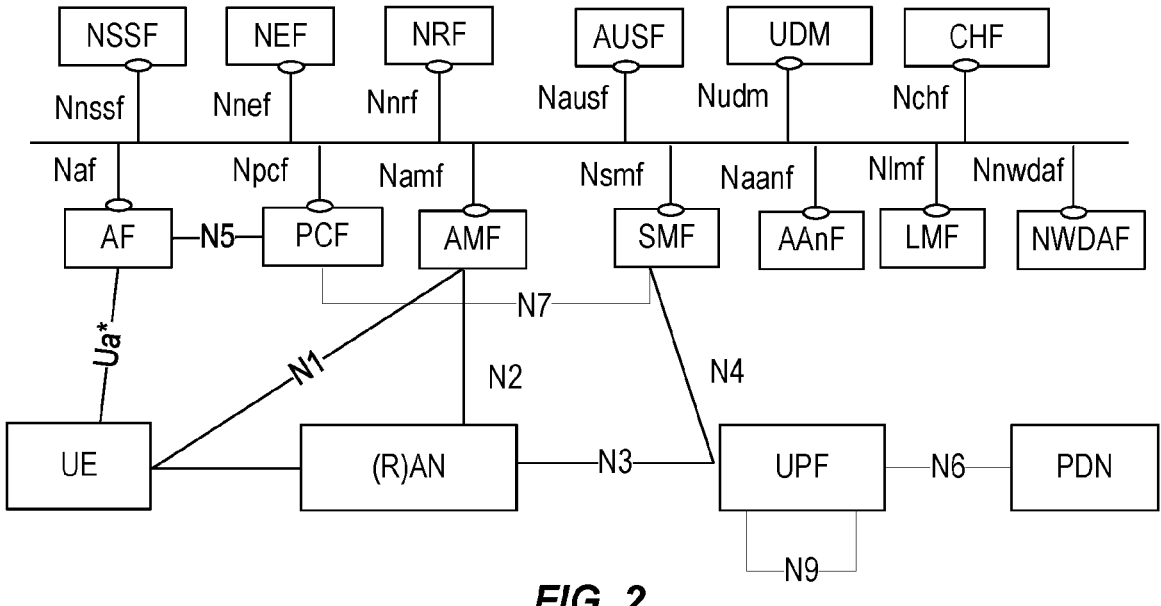

FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e., signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF)—supports handling of user plane traffic based on the rules received from SMF, including packet inspection and different enforcement actions (e.g., event detection and reporting). UPFs communicate with the RAN (e.g., NG-RNA) via the N3 reference point, with SMFs (discussed below) via the N4 reference point, and with an external packet data network (PDN) via the N6 reference point. The N9 reference point is for communication between two UPFs.

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g., bytes, seconds) for a service. CHF also interacts with billing systems.

Access and Mobility Management Function (AMF, with Namf interface) terminates the RAN CP interface and handles all mobility and connection management of UEs (similar to MME in EPC). AMFs communicate with UEs via the N1 reference point and with the RAN (e.g., NG-RAN) via the N2 reference point. An AMF may be co-located with a Security Anchor Function (SEAF, not shown) that holds a root (or anchor) key for a visited network.

Network Exposure Function (NEF) with Nnef interface—acts as the entry point into operator's network, by securely exposing to AFs the network capabilities and events provided by 3GPP NFs and by providing ways for the AF to securely provide information to 3GPP network. For example, NEF provides a service that allows an AF to provision specific subscription data (e.g., expected UE behavior) for various UEs.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g., compute, storage, communication) that provide the capabilities and characteristics of the network slice.

The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

Network Data Analytics Function (NWDAF) with Nnwdaf interface—provides network analytics information (e.g., statistical information of past events and/or predictive information) to other NFs on a network slice instance level.

Location Management Function (LMF) with Nlmf interface—supports various functions related to determination of UE locations, including location determination for a UE and obtaining any of the following: DL location measurements or a location estimate from the UE; UL location measurements from the NG RAN; and non-UE associated assistance data from the NG RAN.

The Unified Data Management (UDM) function supports generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

The UDM may include, or be co-located with, an Authentication Credential Repository and Processing Function (ARPF) that stores long-term security credentials for subscribers. The UDM may also include, or be co-located with, a Subscription Identifier De-concealing Function (SIDF) that maps between different subscriber identifiers.

The NRF allows every NF to discover the services offered by other NFs, and Data Storage Functions (DSF) allow every NF to store its context. In addition, the NEF provides exposure of capabilities and events of the 5GC to AFs within and outside of the 5GC. For example, NEF provides a service that allows an AF to provision specific subscription data (e.g., expected UE behavior) for various UEs.

As mentioned above, 3GPP Rel-16 introduces a new AKMA feature that is based on 3GPP user credentials in 5G, including the IoT use case. More specifically, AKMA leverages the user's AKA credentials to bootstrap security between the UE and an AF, which allows the UE to securely exchange data with an application server. The AKMA architecture can be considered an evolution of Generic Bootstrapping Architecture (GBA) specified for 5GC in Rel-15 and is further specified in 3GPP TS 33.535 (v.16.2.0).

In addition to the NEF, AUSF, and AF shown in FIG. 2 and described above, AKMA also utilizes an anchor function for authentication and key management for applications (AAnF). This function is shown in FIG. 2 with Naanf interface. In general, AAnF interacts with AUSFs and maintains UE AKMA contexts to be used for subsequent bootstrapping requests, e.g., by application functions. At a high level, AAnF is similar to a bootstrapping server function (BSF) defined for Rel-15 GBA.

Figure 3:
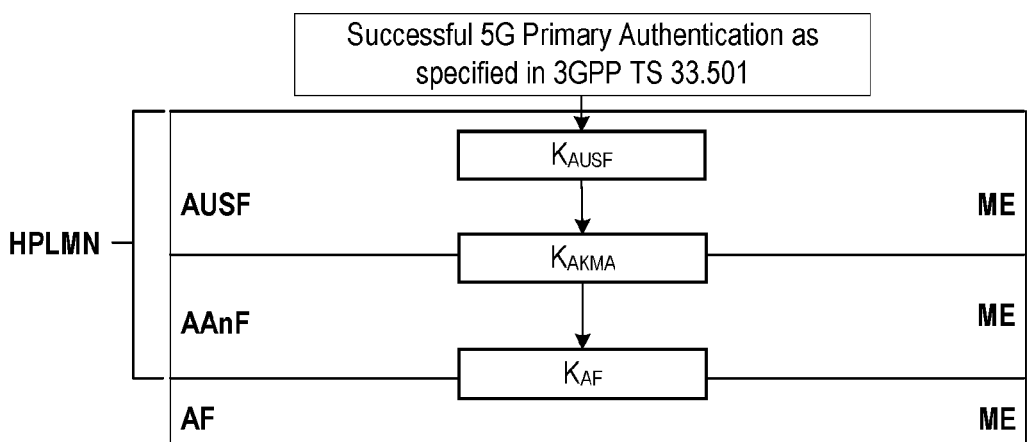
FIG. 3 shows an exemplary hierarchy of security keys in a 5G network.

In general, AKMA reuses the result of 5G primary authentication procedure used to authenticate a UE during network registration (also referred to as "implicit bootstrapping"). In this procedure, AUSF is responsible of generation and storage of key material. In particular, the key hierarchy in AKMA includes the following, which is further illustrated in FIG. 3:

$K_{AUSF}$: root key, output of primary authentication procedure and stored in UE (i.e., mobile equipment, ME, part) and AUSF. Additionally, AUSF can report the result and the particular AUSF instance that generates $K_{AUSF}$ as output of the primary authentication result in UDM, as defined in 3GPP TS 33.501 (v15.11.0).

$K_{AKMA}$: anchor key derived by ME and AUSF from $K_{AUSF}$ and used by AAnF for further AKMA key material generation. The key identifier A-KID is the AKMA Key IDentifier of $K_{AKMA}$. A-KID includes an AKMA Temporary UE Identifier (A-TID) and routing information related to the UE's home network (HPLMN).

$K_{AF}$: application key derived by ME and AAnF from $K_{AKMA}$ and used by UE and the Application to securely exchange application data.

When the UE wants to use AKMA, it constructs $K_{AF}$ and A-KID and sends A-KID to the AF, which can be located in or outside of the operator's network. The AF requests the $K_{AF}$ associated with the A-KID from the AAnF by sending the A-KID to the AAnF via NEF when the AF is located outside the operator's network or directly when the AF is located inside the operator's network. After the authentication of the AF by the operator network, the AAnF sends the corresponding $K_{AF}$ to the AF, possibly via NEF. Thereby the shared key material $K_{AF}$ is available in UE and AF to support the security of the communication between them.

A-KID is in the NAI format specified in IETF RFC 7542 clause 2.2, i.e., username@realm. The username part includes the Routing Indicator (RID) and AKMA Temporary UE Identifier (A-TID), and the realm part includes Home Network Identifier. A-TID is derived from $K_{AUSF}$. For example, A-KID="A-TID"."RID"@homenetworkrealm.

Figure 4:
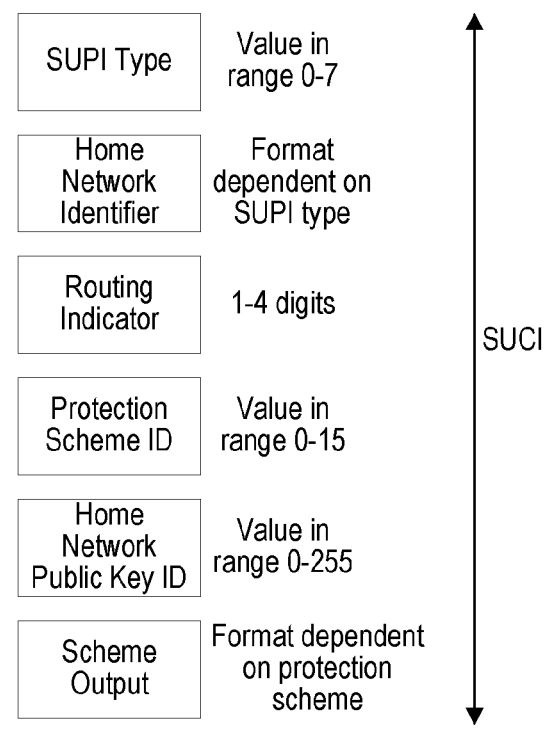
FIG. 4 shows various field of a subscription concealed identifier (SUCI) used in 5G networks.

The RID is an integral part of the Subscription Concealed Identifier (SUCI) used in 5G networks to conceal and/or maintain the privacy of a user's Subscription Permanent Identifier (SUPI). FIG. 4 shows various field of SUCI. The RID can be 1-4 digits, depending on implementation. When coupled with a Home Network Identifier included in the SUCI, the RID facilitates routing of signaling to network functions (NFs) in the home network that can serve the user/sub scriber.

Besides being pre-provisioned by the home network operations, Routing Indicator in UE/USIM may also be dynamically updated by UDM instances in the home network (e.g., via control signalling) when UE is registered in the network. This facilitates flexible capability partition and routing planning for NF instances in the home network.

Figure 5:
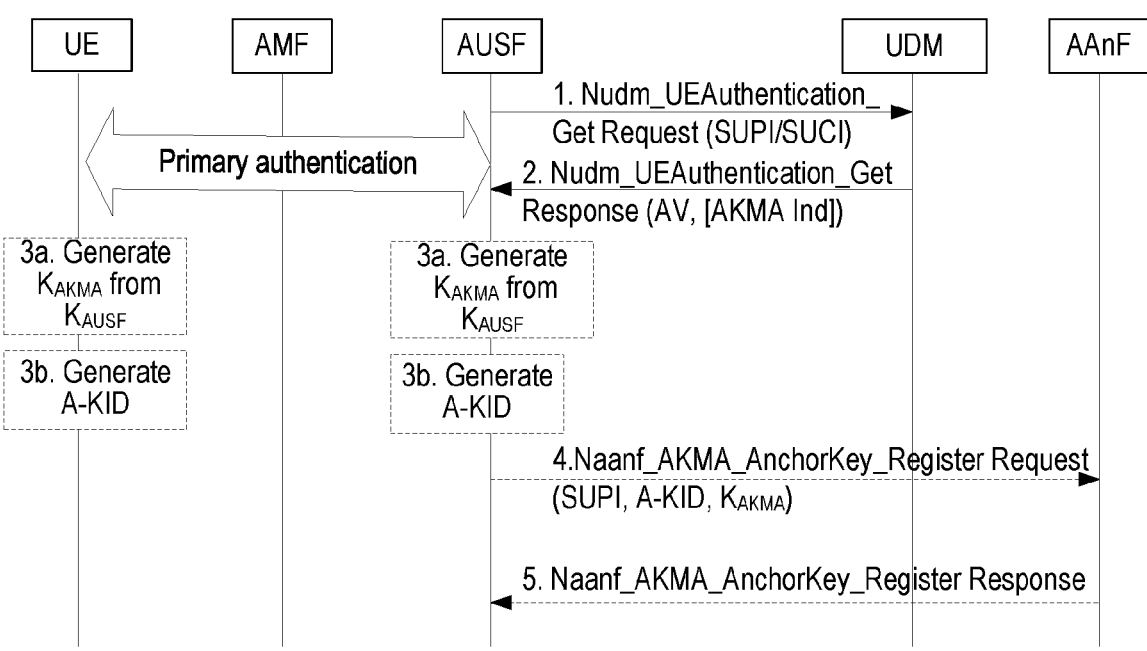
FIGS. 5-6 show signal flow diagrams of exemplary security key generation procedures.

FIG. 5 shows a signal flow diagram of an exemplary procedure for $K_{AKMA}$ generation. Although some of the operations shown in FIG. 5 are given numerical labels, these are meant to facilitate explanation and do not imply any strict temporal order of the operations, unless specifically noted otherwise. Moreover, some of the operations shown in FIG. 5 may be optional.

In operation 1, during the primary authentication procedure, the AUSF interacts with the UDM to fetch authentication information such as subscription credentials (e.g., AKA Authentication vectors) and the authentication method using the Nudm_UEAuthentication_Get Request service operation. In the Nudm_UEAuthentication_Get Response of operation 2, the UDM may also indicate to the AUSF whether AKMA Anchor keys need to be generated for the UE. If the AUSF receives the AKMA indication (AKMA Ind) from the UDM, the AUSF stores the $K_{AUSF}$ and generates $K_{AKMA}$ (operation 3a) and A-KID (operation 3b) from $K_{AUSF}$ after the primary authentication procedure is successfully completed. Likewise, the UE also generates $K_{AKMA}$ (operation 3$a$) and A-KID (operation 3$b$) from $K_{AUSF}$ before initiating communication with an AKMA AF.

In operation 4, after AKMA key material is generated, the AUSF sends the generated A-KID and $K_{AKMA}$ to the AAnF together with the UE's SUPI, using the Naanf_AK-MA_KeyRegister Request service operation. The AAnF stores this information sent by the AUSF and responds with an Naanf_AKMA_KeyRegister Response service operation.

Figure 6:
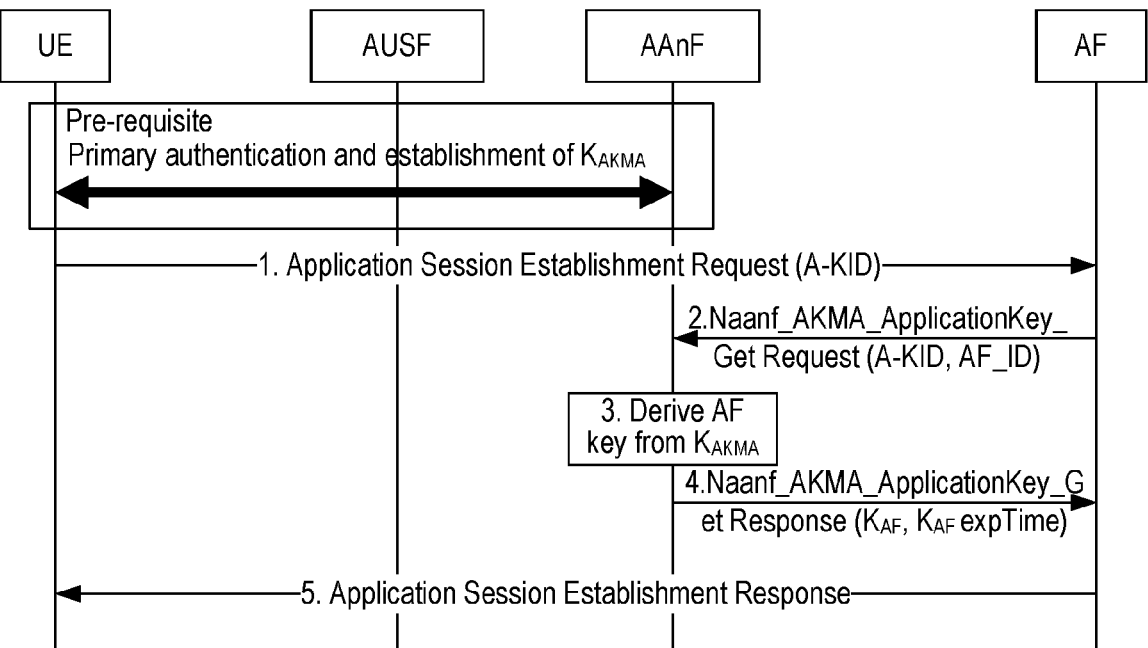

FIG. 6 shows a signal flow diagram of an exemplary procedure for $K_{AF}$ generation. Although some of the operations shown in FIG. 6 are given numerical labels, these are meant to facilitate explanation and do not imply any strict temporal order of the operations, unless specifically noted otherwise.

A primary authentication between UE and AAnF is a prerequisite for the exemplary procedure for $K_{AF}$ generation, as well as UE generation of $K_{AKMA}$ and A-KID from $K_{AUSF}$ as discussed above. In operation 1, the UE sends an Application Establishment Request including A-KID to the AF. The UE may derive $K_{AF}$ before or after sending the message.

In operation 2, if the AF does not have an active context associated with the received A-KID, the AF discovers and selects an AAnF (e.g., based on the Routing Indicator in A-KID) that can handle the request from UE. The AF sends an Naanf_AKMA_ApplicationKey_Get Request to AAnF, including the received A-KID and an AF identifier (AF_ID). AF ID consists of the fully qualified domain name (FQDN) of the AF and the Ua* security protocol identifier, which identifies the security protocol that the AF will use with the UE. Upon receiving this request, the AAnF checks whether it can provide the service to the AF based on the configured local policy or based on the authorization information or policy provided by the NRF using the AF ID. If unsuccessful, the AAnF shall reject the request and the procedure terminates. The AAnF verifies whether the subscriber is authorized to use AKMA based on the presence of the UE-specific $K_{AKMA}$ identified by A-KID. If $K_{AKMA}$ is present in AAnF, the AAnF continues with operation 3; otherwise, the AAnF skips operation 3 and performs operation 4 using an error response.

In operation 3, AAnF derives AF key ($K_{AF}$) from $K_{AKMA}$ if it does not already have the requisite $K_{AF}$. The key derivation procedure is described in 3 GPP TS 38.535 (v17.0.0) Annex A.4. In operation 4, AAnF sends an Naan-f_AKMA_ApplicationKey_Get Response to AF, including $K_{AF}$ and an expiration time for $K_{AF}$. In operation 5, the AF sends an Application Session Establishment Response to the UE. If the information received in operation 4 indicated failure of AKMA key request, the AF rejects the Application Session Establishment by including a failure cause. Afterwards, the UE may trigger a new Application Session Establishment request with the latest A-KID to the AKMA AF.

Figure 7:
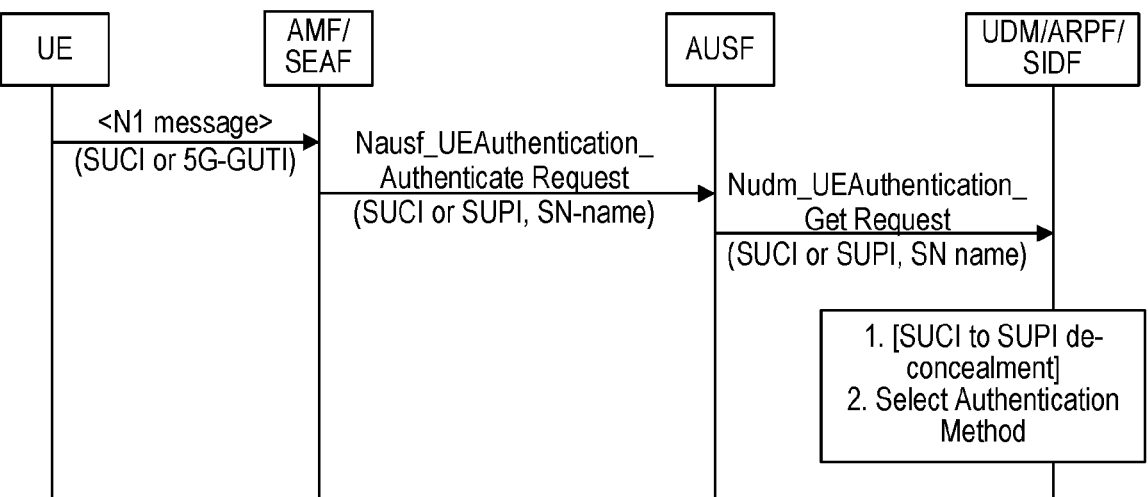
FIG. 7 shows a signal flow diagram of an exemplary procedure for initiation of user equipment (UE) authentication and selection of authentication method.

An AMF/SEAF may initiate an authentication with a UE during any procedure establishing a signalling connection with the UE. FIG. 7 shows a signal flow diagram of an exemplary procedure for initiation of UE authentication and selection of authentication method. Although some of the operations shown in FIG. 7 are given numerical labels, these are meant to facilitate explanation and do not imply any strict temporal order of the operations, unless specifically noted otherwise.

Initially, the UE sends a message over the N1 interface to the AMF. This is shown generically as "N1 message" but in some instances can be a Registration Request. In this message, the UE includes either SUCI or a 5G Global Unique Temporary Identifier (5G-GUTI). The 5G-GUTI is assigned by an AMF and includes a public land mobile network (PLMN) identifier, an AMF ID, and a temporary mobile subscriber identifier (TMSI). 5G-GUTI is assigned temporarily rather than being permanently fixed to any specific subscriber or UE. For example, an ANTE may re-assign a new 5G-GUTI to a UE at any time under various conditions.

Subsequently, the AMF/SEAF includes the corresponding SUPI in the authentication request to the AUSF (i.e., Naus-f_UEAuthentication_Authenticate) when the AMF/SEAF has a valid 5G-GUTI and thereby re-authenticates the UE. Otherwise, the AUSF includes SUCI in the authentication request. As such, different AUSF instances involved in initial and/or subsequent authentication procedures may or may not obtain the UE's SUCI and the Routing Indicator included therein.

The AUSF forwards the authentication request to the UDM (including co-located ARPF/SIDF). When SUCI is supplied in the authentication request, SIDF performs SUCI to SUPI de-concealment and maps SUCI to SUPI. The UDM also selects an authentication method and sends SUPI back to AUSF for further usage (not shown).

As briefly mentioned above, when SUPI rather than SUCI is used in primary authentication of a UE, the AUSF may not be able to obtain the Routing Indicator (RID) included in SUCI. One exemplary scenario is when the AMF selects a different AUSF instance (e.g., AUSF2) than the AUSF instance (e.g., AUSF1) that carried out an authentication procedure based on SUCI from the UE. Another exemplary scenario is when a UE's authentication context (e.g., including routing indicator) stored in AUSF1 has been cleared, deleted, and/or removed after initial authentication.

Since RID is a mandatory attribute for generating AKMA key material (e.g., A-KID), AKMA key generation procedures will fail in these instances. This can cause various problems, issues, and/or difficulties. For example, without AKMA key material, the network cannot subsequently generate application keys to be used by AFs for application sessions with the UE. This is highly undesirable.

Embodiments of the present disclosure address these and other problems, issues, and/or difficulties by providing novel, flexible, and efficient techniques for facilitating Routing Indicator retrieval from UDM, which is a trustworthy and under home network (HPLMN) control. Benefits of these embodiments include control of home network over retrieval and use of Routing Indicators, as well as trustworthiness of Routing Indicators obtained in this manner. Other embodiments facilitate AUSF/AAnF generation and use of an A-KID without Routing Indicator, e.g., A-TID only. In all cases, a high-level benefit is availability of AKMA key material needed to generate application keys to be used by AFs for application sessions with a UE.

Figure 8:
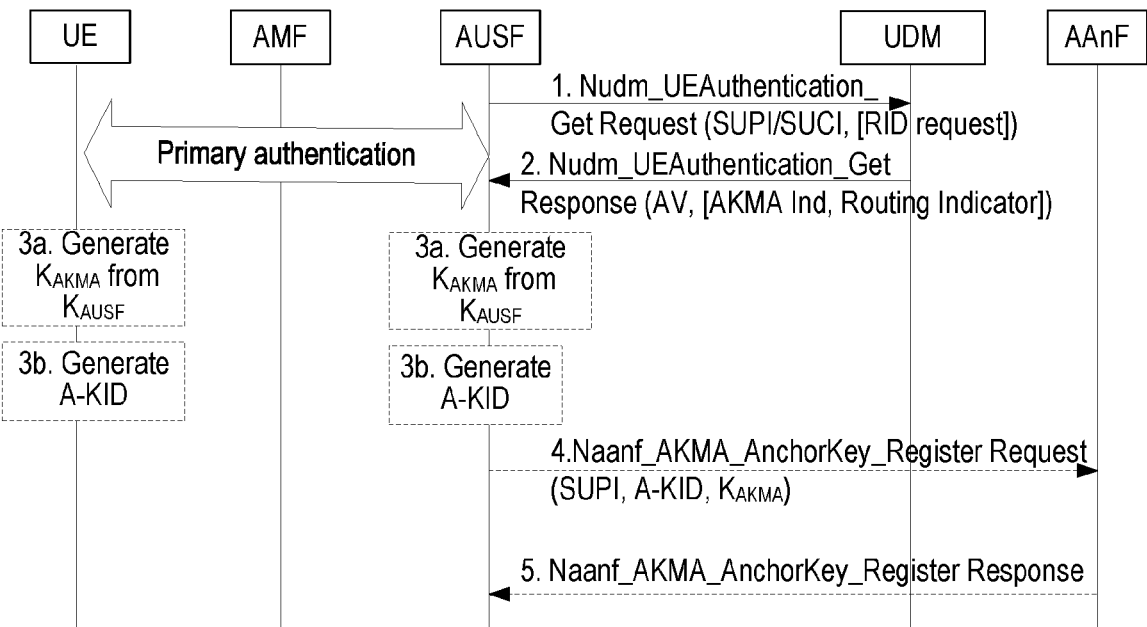

FIG. 8 shows a signal flow diagram of an exemplary key generation procedure, according to some embodiments of the present disclosure. Many operations in FIG. 8 are substantially similar to those shown in FIG. 5.

In general terms, the AUSF will during the primary authentication receive an authentication request including a first or a second identifier. The first identifier may, for example, be a SUCI and the second identifier may, for example, be a SUPT. As described above with reference to FIG. 7, the SUCI or SUPI may be received from an AMF or a SEAF.

The AUSF may, in operation 1, perform a second authentication request to the UDM comprising the first or the second identifier, and optionally comprising an explicit request for a first field. The first field may correspond to a first field of the first identifier. In some examples the first field is an RID. In one exemplary embodiment, in operation 1, the AUSF may perform a Nudm_UEAuthentication_Get Request service operation which may include a request for the RID. This may be beneficial in the event where the RID is not already available to the AUSF. The request for the RID is optional. This is shown in FIG. 8 as an optional information element.

The UDM may determine whether an AKMA indicator is to be returned in the response to the AUSF. The AKMA indicator may indicate to the AUSF that AKMA key material is to be generated. If the AKMA indicator is to be included in the response the UDM may also include the first field, which in this example is an RID. This is illustrated in operation 2. The UDM the UDM may retrieve first field from one of the following:

the UE's subscription data;

a de-concealment procedure from the second identifier to a first identifier, for example trough a SUCI to SUPI de-concealment procedure; or a previous stored successful Authentication result (discussed in more detail below).

Thus, the AUSF may receive, in operation 2, a response from the UDM to the second authentication request which may comprise an AKMA indicator and the first field.

In one embodiment, receiving the response comprises a Nudm_UEAuthentication_Get Response of operation 2, the UDM can include the RID as per explicit request of the AUSF in operation 1. Alternatively, the UDM can decide to include the RID when the response also includes AKMA Ind. In some of these examples, the UDM may include the RID when the Nudm_UEAuthentication_Get Response includes the UEs SUPI rather than SUCI. In some examples the UDM may return the RID dependent on a determination performed by the UDM that the AKMA indicator should be included in the response.

After receiving a response including RID, the AUSF can derive an anchor key (KAKMA) for the UE (operation 3*a*). In addition, the AUSF may generate a first security key identifier, for example an A-KID, based on the received first field, for example an RID. (operation 3*b*).

The AUSF may further send, to an anchor function for authentication and key management for applications, AAnF, a message including the anchor key (KAKMA) and the first security key identifier. The AAnF may be comprised in the communication network. In some examples, the message further comprises the second identifier. The second identifier, as discussed above, is in some examples is a SUPI. In one specific example, in operation 4, after AKMA key material is generated, the AUSF sends the generated A-KID and $K_{AKMA}$ to the AAnF together with the UE's SUPI, using the Naanf_AKMA_KeyRegister Request service operation. The AAnF stores this information sent by the AUSF and responds with an Naanf_AKMA_KeyRegister Response service operation.

Figure 9:
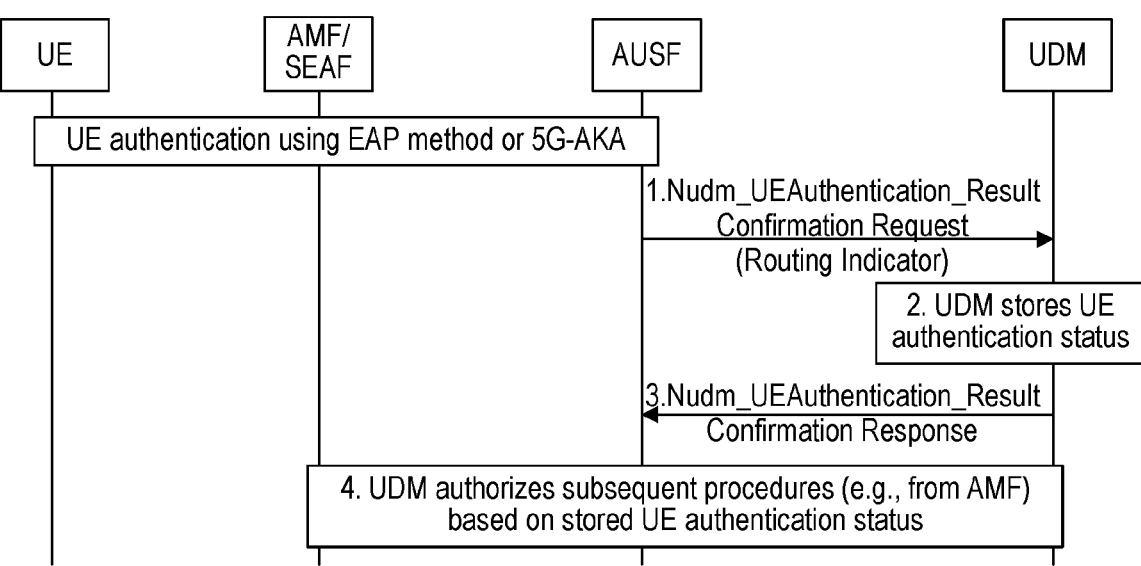

FIG. 9 shows a signal flow diagram of an exemplary key generation procedure, according to other embodiments of the present disclosure. Although some of the operations shown in FIG. 9 are given numerical labels, these are meant to facilitate explanation and do not imply any strict temporal order of the operations, unless specifically noted otherwise.

Operation 0 (which can be seen as a prerequisite or precondition), the UE and AUSF perform an authentication procedure using an extensible authentication protocol (EAP) method or a 5G-AKA-related method, such as exemplified by FIG. 5. When the UE provides a SUCI in operation 0, the AUSF includes the Routing Indicator portion of the SUCI in an Nudm_UEAuthentication_ResultConfirmation Request to the UDM in operation 1. The UDM stores the authentication status of the UE including Routing Indicator (operation 2) and responds to the AUSF (operation 3). In operation 4, the UDM authorizes subsequent authentication procedures (e.g., by AMF) based on the stored UE authentication status.

Figure 10:
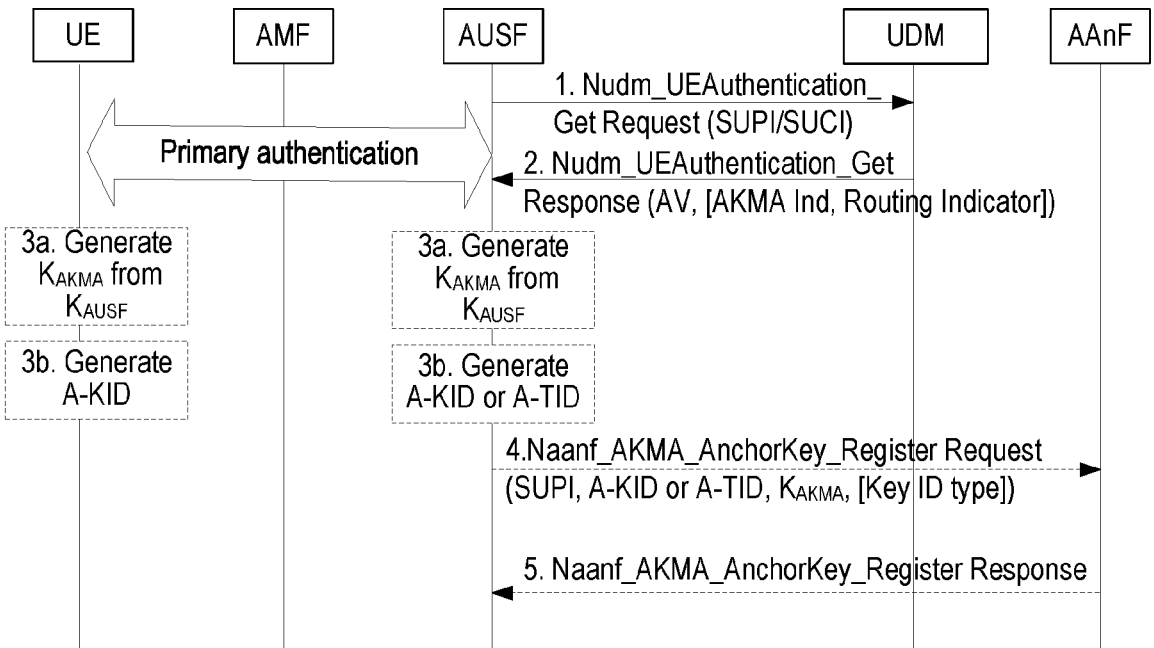

Other embodiments include procedures for deriving AKMA key material after primary authentication, with or without availability of the Routing Indicator to AUSF. FIG. 10 shows a signal flow diagram of an exemplary key generation procedure, according to these embodiments. Many operations in FIG. 10 are substantially similar to those shown in FIGS. 5 and 8.

In operation 3*b*, the AUSF may, after receiving an AKMA indicator and a first field in step 2, generate a first security key identifier based on the first field. If the first filed is not available, the AUSF may generate a second security key identifier not based on the first field. In operation 4, the AUSF may include the first or second security key identifier in a message to the AAnF. Optionally, the AUSF may also indicate which of the two security key identifier is included in a message by including a security key identifier type.

A more specific example of the method described above follows here. In operation 3*b*, the AUSF generates A-KID in when the AUSF has received the AKMA indicator and the UE's RID is available. When the RID is not available, the AUSF may instead generate AKMA Temporary UE Identifier (A-TID) from $K_{AUSF}$. In operation 4, the AUSF includes the generated A-KID or A-TID in the message to AAnF. Optionally, the AUSF can also indicate which of the two identifiers is included in the message, e.g., by an AKMA Key ID type.

FIG. 11 shows a signal flow diagram of an exemplary procedure for $K_{AF}$ generation, according to these embodiments. Since many operations in FIG. 11 are substantially similar to those shown in FIG. 6, only the differences are described below. In this procedure, it is assumed that the AUSF provided A-TID to AAnF in the manner described above.

In operation 3*a*, upon receiving A-KID from the AF, the AAnF derives the A-TID corresponding to the received A-KID. In operation 3*b*, the AAnF searches for AKMA key material based on the derived A-TID. For example, the AAnF can look for a match between the derived A-TID and the A-TID previously provided by AUSF. Upon finding the matching A-TID, the AAnF retrieves the associated $K_{AKMA}$ and uses it to derive $K_{AF}$ (operation 3*c*).

The embodiments described above can be further illustrated with reference to FIGS. 12-14, which depict exemplary methods (e.g., procedures) for an AUSF, an AAnF, and a UDM, respectively. Put differently, various features of the operations described below correspond to various embodiments described above. The exemplary methods shown in to FIGS. 12-14 can be used cooperatively (e.g., with each other and/or with other procedures described herein) to provide benefits, advantages, and/or solutions to problems described herein. Although the exemplary methods are illustrated in to FIGS. 12-14 by specific blocks in particular orders, the operations corresponding to the blocks can be performed in different orders than shown and can be combined and/or divided into operations having different functionality than shown. Optional blocks and/or operations are indicated by dashed lines.

In particular, FIGS. 12A and B illustrate an exemplary methods (e.g., procedures) for an authentication server function (AUSF) in a communication network, according to various exemplary embodiments of the present disclosure. The exemplary method shown in FIGS. 12A and 12B can be performed by an AAnF such as described herein with reference to other figures. Optional method steps are illustrated by dashed lines in FIGS. 12A and 12B.

The exemplary method can include the operations of block 1210, where the AUSF can receive, from a user equipment (UE), an authentication request that includes either a first identifier associated with the UE or a second identifier associated with the UE. The exemplary method can also include the operations of block 1220 or block 1250. In block 1220, the AUSF can determine a first security key identifier based on a first field, which may be included in the first identifier or corresponding to the first identifier, that is obtained from a unified data management function (UDM) of the communication network. In block 1250, the AUSF can determine a second security key identifier that is not based on a first field of the first identifier. The method may further comprise sending 1240 to the UDM, the first field.

In some embodiments, when the authentication request includes the first identifier, the exemplary method can also include the operations of blocks 1230-1240, where the AUSF can determine 1230 the first security key identifier based on a first field, the first field can be said to be included in the first identifier or correspond to a first field of the first identifier, and send 1240, to the UDM, the first field included in the first identifier.

In some embodiments, the second identifier can be a SUPI which has been generated from or is corresponding to a 5G Global Unique Temporary Identifier (5G-GUTI) (see FIG. 7), the first identifier can be a subscription concealed identifier (SUCI), and the first field can be a Routing Indicator (RID) associated with a home network of the UE. In such embodiments, the first security key identifier can be an authentication and key management for applications (AKMA) key identifier (A-KID) and the second security key identifier can be an AKMA Temporary UE Identifier (A-TID).

In some embodiments, determining the first security key identifier based on the first field obtained from the UDM (e.g., in block 1220) can include the operations of sub-blocks 1221-1223, where the AUSF can receive the second identifier from the AMF or SEAF determined based on third identifier associated with the UE; send, to the UDM, an authentication request that includes the third identifier; and receive the first field from the UDM in response to the authentication request. In some of these embodiments, the authentication request can include an explicit request for the first field. In some of these embodiments, the third identifier can be a subscription permanent identifier (SUPI).

In some embodiments, the exemplary method can also include the operations of blocks 1260-1270, where the AUSF can derive an anchor key ($K_{AKMA}$) for the UE and send, to an AAnF of the communication network, a message including the anchor key ($K_{AKMA}$) and the determined security key identifier. In some embodiments, the message can also include an indication of whether the included security key identifier is the first security key identifier or the second security key identifier (e.g., a key identifier type indicator).

In some embodiments, determining the second security key identifier (e.g., in block 1220) can be further based on a determination that the first field of the first identifier associated with the UE is unavailable to the AUSF.

FIG. 12B includes generally the same steps as the method described above with reference to FIG. 12A, with the omission of the optional steps of 1221, 1240, and 1250.

These steps may however beneficially be included also in the method shown in FIG. 12B. FIG. 12B further comprises the step 1224 of receiving an AKMA indicator from a UDM in response to the authentication request. An example of this step is also illustrated, for example, in FIG. 8.

In addition, FIGS. 13A and 13B illustrate exemplary methods (e.g., procedures) for a unified data management function (UDM) of a communication network, according to various exemplary embodiments of the present disclosure. The exemplary methods shown in FIGS. 13A and 13B can be performed by a UDM such as described herein with reference to other figures. The exemplary method of FIG. 13A can include the operations of block 1310, where the UDM can receive, from an AUSF of the communication network, an authentication request for a UE that includes either a first identifier associated with the UE or a second identifier associated with the UE. When the authentication request includes the second identifier, the exemplary method can also include the operations of block 1320, where the UDM can obtain a first field of, or corresponding to a field of, the first identifier and send the first field to the AUSF in response to the authentication request. By a "corresponding field" it may be meant that the first field comprises a data field corresponding to a data field of the first identifier, i.e. that the fields have the same values. In some examples, as described below with reference to how the UDM may obtain the first field, the UDM may obtain the first field from a previously stored field of a received first identifier. When the authentication request includes the first identifier, the exemplary method can also include the operations of block 1330, where the UDM can store the first field included in the first identifier.

In some embodiments, obtaining the first field (e.g., in block 1320) can include the operations of either sub-block 1321 or sub-block 1322. In sub-block 1321, the UDM can retrieve a stored version of the first field from UE subscription data or from a previous successful authentication of the UE. In sub-block 1322, the UDM can perform a de-concealment operation on the second identifier to generate the first identifier, including the first field.

In some embodiments, sending the first field to the AUSF (e.g., in block 1320) can be responsive to one of the following: an explicit request for the first field, included in the authentication request; or inclusion of an AKMA indicator in the response to the authentication request.

In some embodiments, the second identifier can be a subscription permanent identifier (SUPI), the first identifier can be a subscription concealed identifier (SUCI), and the first field can be a Routing Indicator (RID) associated with a home network of the UE. As described above, the SUPI may be corresponding to, or determined based on, a 5G Global Unique Temporary Identifier (5G-GUTI).

The exemplary method of FIG. 13B can include the operations of block 1310, where the UDM may receive, from an AUSF of the communication network, an authentication request for a UE that includes either a first identifier associated with the UE or a second identifier associated with the UE. The method may further comprise determining 1315 whether an AKMA indicator should be included in a response to the authentication request. An example of this step is also shown in FIG. 8. When the response should include the AKMA indicator, the method may further comprise obtaining 1320 a first field and sending the first field to the AUSF in response to the authentication request. The obtaining 1320 may comprise retrieving 1321 a stored version of the first filed from UE subscription data or from a previous successful authentication of the UE. The method may alternatively comprise performing 1322 a de-conceal-ment operation on the second identifier to generate the first identifier, including the first field.

In addition, FIG. 14 illustrates an exemplary method (e.g., procedure) for an anchor function for an authentication and key management for applications (AAnF) in a communica-tion network, according to various exemplary embodiments of the present disclosure. The exemplary method shown in FIG. 14 can be performed by an AAnF such as described herein with reference to other figures.

The exemplary method can include the operations of block 1410, where the AAnF can receive, from an authen-tication server function (AUSF) of the communication net-work, an anchor key ($K_{AKMA}$) for a user equipment (UE) together with one of the following security key identifiers:

a first security key identifier based on a first field of a first identifier associated with the UE; or a second security key identifier that is not based on the first field.

The exemplary method can also include the operations of block 1420, where the AAnF can store the anchor key ($K_{AKMA}$) in association with received security key identifier. The exemplary method can also include the operations of block 1430, where the AAnF can receive, from an applica-tion function (AF) associated with the communication net-work, a request for a security key ($K_{AF}$) associated with an application session between the AF and the UE, wherein the request includes a third security key identifier associated with the UE. The exemplary method can also include the operations of block 1440, where the AAnF can, based on determining that the third security key identifier corresponds to the stored security key identifier, derive the security key ($K_{AF}$) associated with the application session based on the anchor key ($K_{AKMA}$) stored in association with the received security key identifier. In some embodiments, the exemplary method can also include the operations of block 1450, where the AAnF can send the derived security key ($K_{AF}$) to the AF.

In some embodiments, the second identifier can be a subscription permanent identifier (SUPI), the first identifier can be a subscription concealed identifier (SUCI), and the first field can be a Routing Indicator (RID) associated with a home network of the UE. In such embodiments, the first security key identifier can be an authentication and key management for applications (AKMA) key identifier (A-KID) and the second security key identifier can be an AKMA Temporary UE Identifier (A-TID).

In some embodiments, when the anchor key ($K_{AKMA}$) is stored in association with the second security key identifier, determining that the third security key identifier corresponds to the stored security key identifier (e.g., in block 1440) can include the operations of sub-blocks 1441-1442. In sub-block 1441, the AAnF can determine a fourth security key identifier from the received third security key identifier. In sub-block 1442, the AAnF can determine a match between the fourth security key identifier and the second security key identifier. In some embodiments, the third security key identifier can be an authentication and key management for applications (AKMA) key identifier (A-KID) and the fourth security key identifier can be an AKMA Temporary UE Identifier (A-TID).

Figure 15:
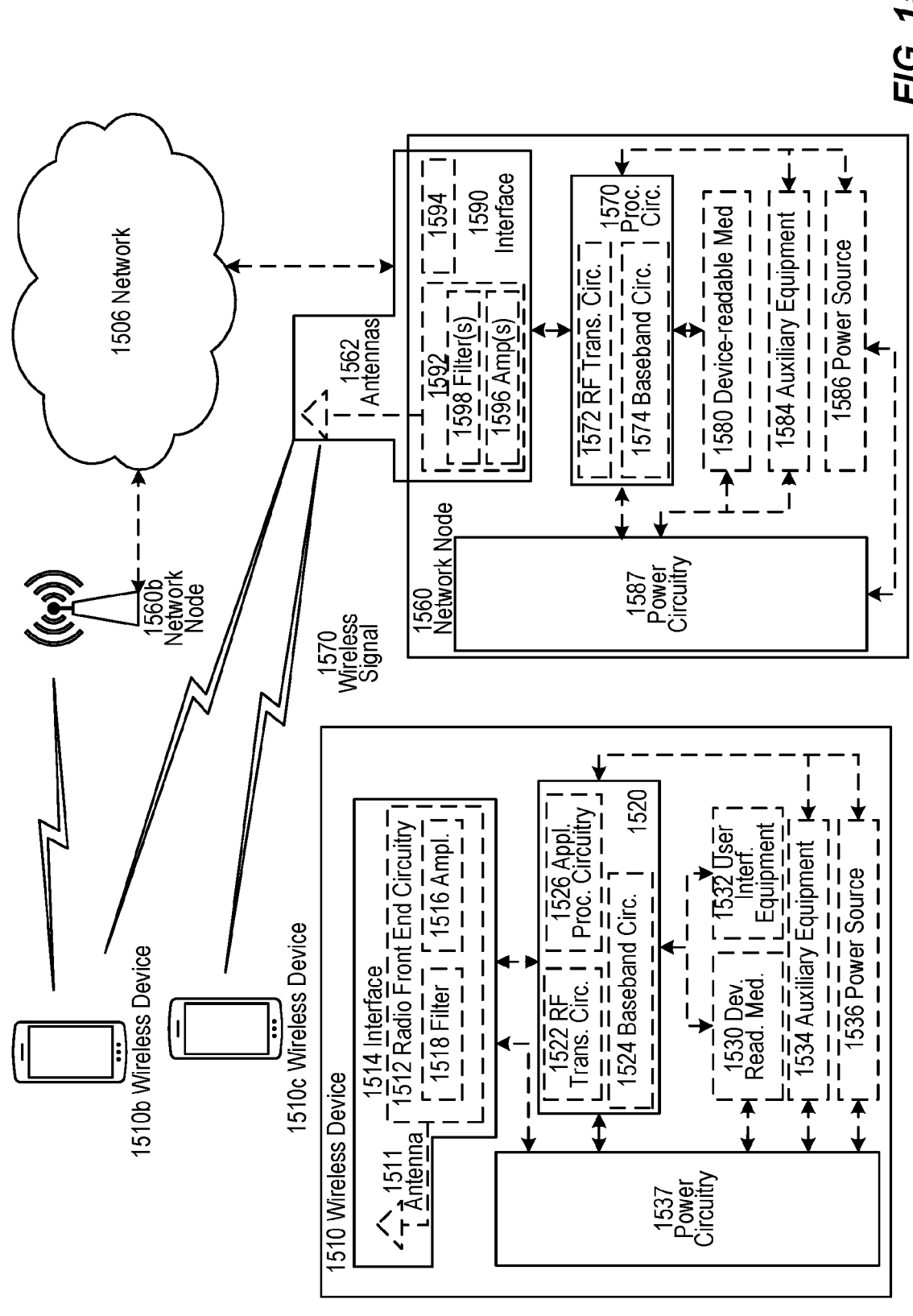
FIG. 15 illustrates a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 15. For sim-plicity, the wireless network of FIG. 15 only depicts network 1506, network nodes 1560 and 1560*b*, and WDs 1510,

1510*b*, and 1510*c*. In practice, a wireless network can further include any additional elements suitable to support communication between wireless devices or between a wireless device and another communication device, such as a landline telephone, a service provider, or any other net-work node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cel-lular, and/or radio network or other similar type of system. In some embodiments, the wireless network can be config-ured to operate according to specific standards or other types of predefined rules or procedures. Thus, particular embodi-ments of the wireless network can implement communica-tion standards, such as Global System for Mobile Commu-nications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 stan-dards; and/or any other appropriate wireless communication standard, such as the Worldwide Interoperability for Micro-wave Access (WiMax), Bluetooth, Z-Wave and/or ZigBee standards.

Network 1506 can comprise one or more backhaul net-works, core networks, IP networks, public switched tele-phone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These compo-nents work together in order to provide network node and/or wireless device functionality, such as providing wireless connections in a wireless network. In different embodi-ments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a dis-tributed radio base station can also be referred to as nodes in a distributed antenna system (DAS).

Further examples of network nodes include multi-stan-dard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and an RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1560, either alone or in conjunction with other network node 1560 components (e.g., device readable medium 1580). Such functionality can include any of the various wireless features, functions, or benefits discussed herein.

For example, processing circuitry 1570 can execute instructions stored in device readable medium 1580 or in memory within processing circuitry 1570. In some embodiments, processing circuitry 1570 can include a system on a chip (SOC). As a more specific example, instructions (also referred to as a computer program product) stored in medium 1580 can include instructions that, when executed by processing circuitry 1570, can configure network node 1560 to perform operations corresponding to various exemplary methods (e.g., procedures) described herein.

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units.

In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592. Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component). Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

Furthermore, various network functions (NFs, e.g., UDM, AAnF, AUSF, etc.) described herein can be implemented with and/or hosted by different variants of network node 1560, including those variants described above.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD 1510.

Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1510 functionality either alone or in combination with other WD 1510 components, such as device readable medium 1530. Such functionality can include any of the various wireless features or benefits discussed herein.

For example, processing circuitry 1520 can execute instructions stored in device readable medium 1530 or in memory within processing circuitry 1520 to provide the functionality disclosed herein. More specifically, instructions (also referred to as a computer program product) stored in medium 1530 can include instructions that, when executed by processor 1520, can configure wireless device 1510 to perform operations corresponding to various exemplary methods (e.g., procedures) described herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510 and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
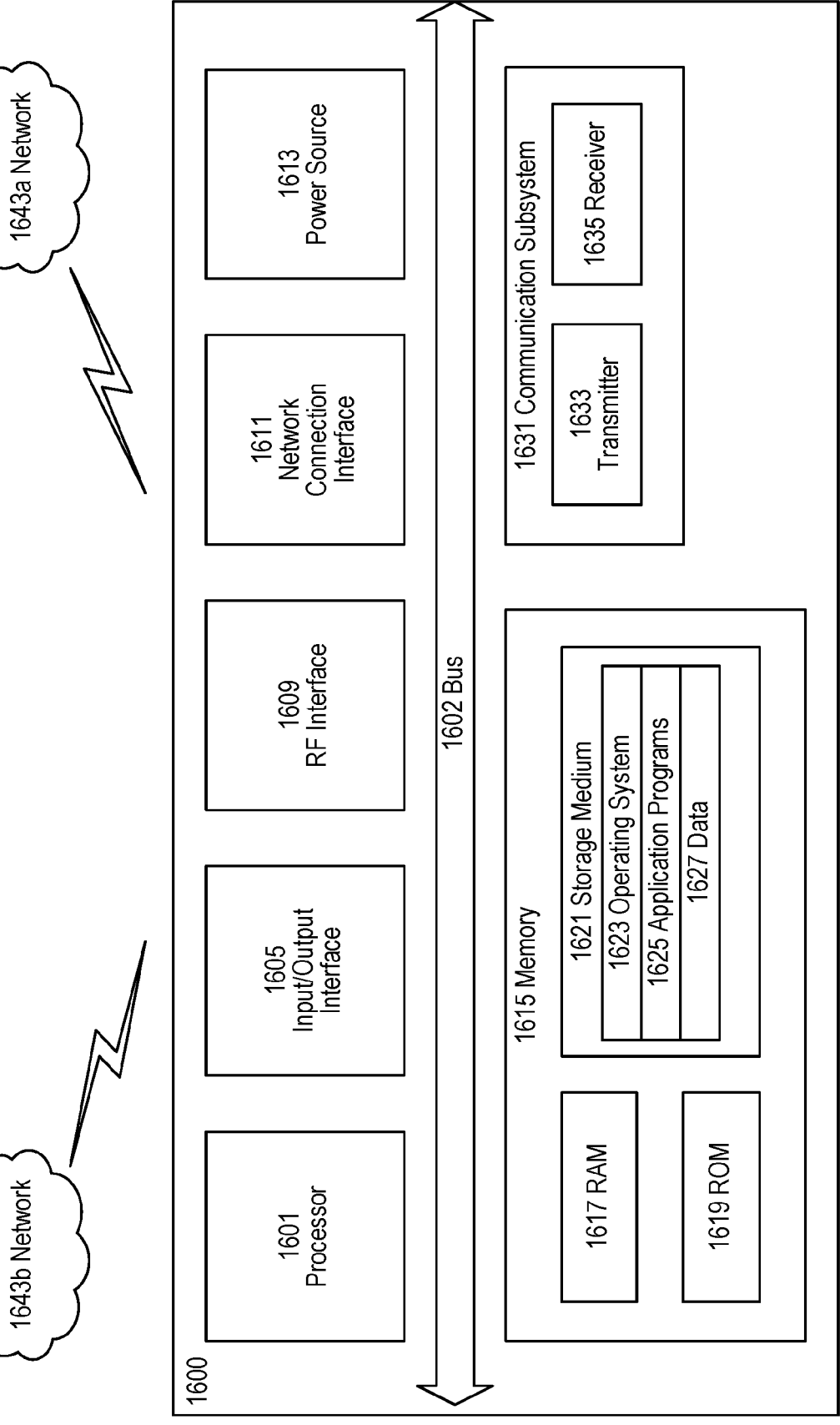
FIG. 16 shows an exemplary embodiment of a UE, in accordance with various aspects described herein.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1600 can be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643a. Network 1643a can encompass wired and/or wireless networks such as a local-area network (LAN), a wide-area network (WAN), a computer network, a wireless network, a telecommunications network, another like network or any combination thereof. For example, network 1643a can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1621 can be configured to include operating system 1623; application program 1625 such as a web browser application, a widget or gadget engine or another application; and data file 1627. Storage medium 1621 can store, for use by UE 1600, any of a variety of various operating systems or combinations of operating systems. For example, application program 1625 can include executable program instructions (also referred to as a computer program product) that, when executed by processor 1601, can configure UE 1600 to perform operations corresponding to various exemplary methods (e.g., procedures) described herein.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643b using communication subsystem 1631. Network 1643a and network 1643b can be the same network or networks or different network or networks. Communication subsystem 1631 can be configured to include one or more transceivers used to communicate with network 1643b. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643b can encompass wired and/or wireless networks such as a local-area network (LAN), a wide-area network (WAN), a computer network, a wireless network, a telecommunications network, another like network or any combination thereof. For example, network 1643*b* can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software, or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
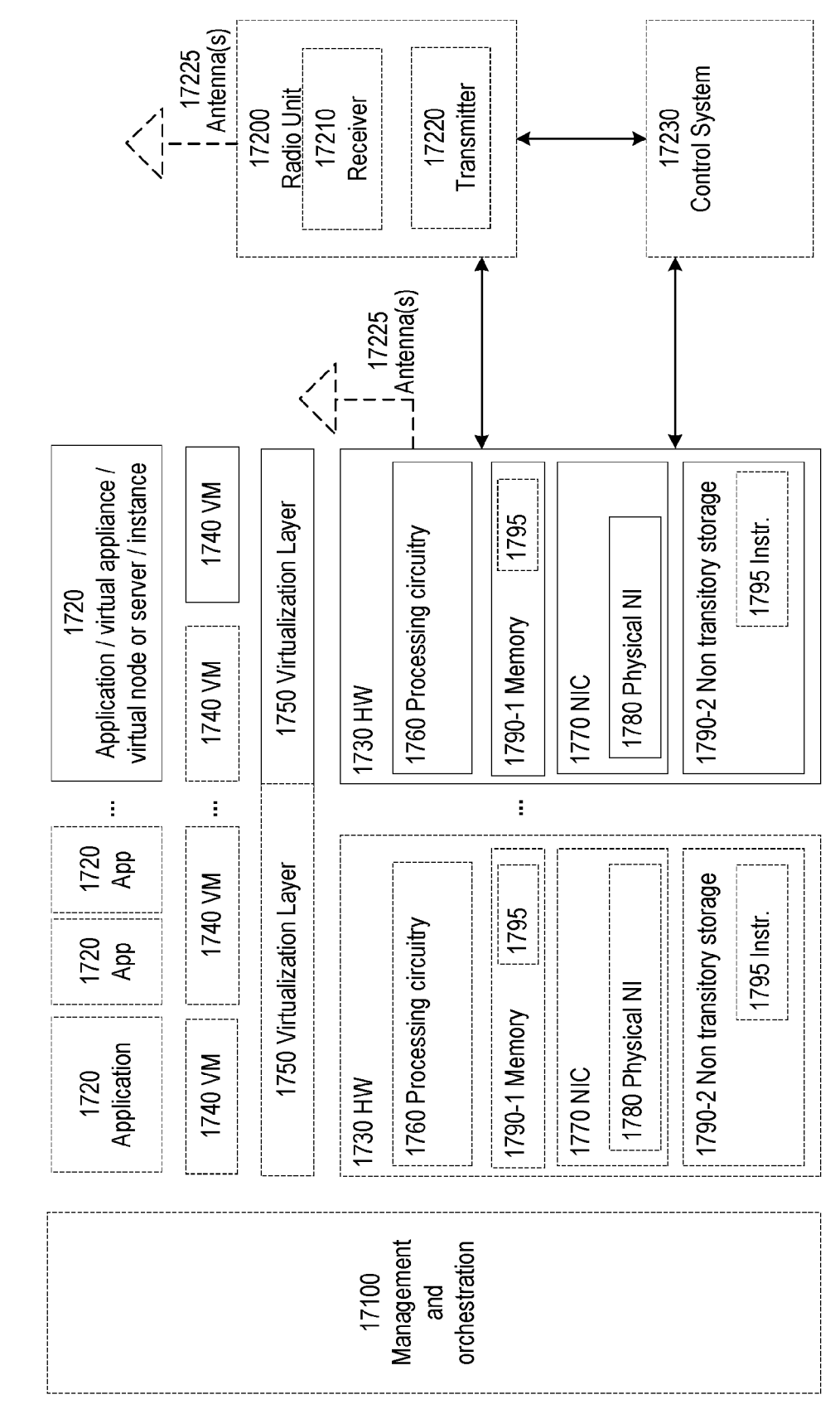
FIG. 17 is a block diagram illustrating an exemplary virtualization environment usable for implementation of various embodiments of network nodes or NFs described herein.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700 can include general-purpose or special-purpose network hardware devices (or nodes) 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. For example, instructions 1795 can include program instructions (also referred to as a computer program product) that, when executed by processing circuitry 1760, can configure hardware node 1720 to perform operations corresponding to various exemplary methods (e.g., procedures) described herein. Such operations can also be attributed to virtual node(s) 1720 that is/are hosted by hardware node 1730.

Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 17230, which can alternatively be used for communication between the hardware nodes 1730 and radio units 17200.

Furthermore, various network functions (NFs, e.g., UDM, AAnF, AUSF, etc.) described herein can be implemented with and/or hosted by different variants of hardware 1730, including those variants described above.

Figure 18:
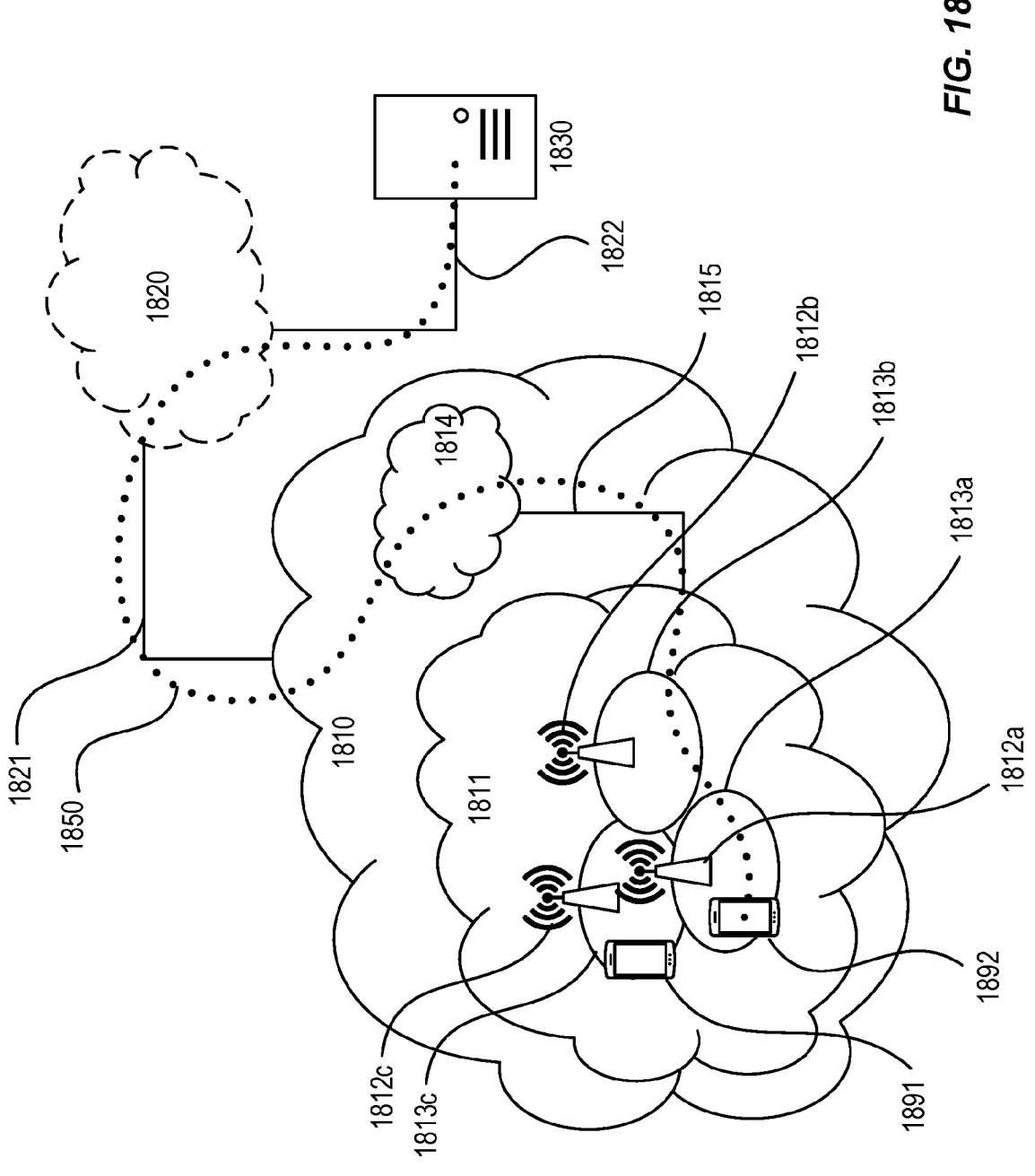
FIGS. 18-19 are block diagrams of various exemplary communication systems and/or networks, according to various exemplary embodiments of the present disclosure.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* can be configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the Telecommunication network 1810 is itself connected to host computer 1830, which can be embodied in the hardware and/or software of a standalone server, a cloud-implemented server, a distributed server or as processing resources in a server farm. Host computer 1830 can be under the ownership or control of a service provider or can be operated by the service provider or on behalf of the service provider. Connections 1821 and 1822 between telecommunication network 1810 and host computer 1830 can extend directly from core network 1814 to host computer 1830 or can go via an optional intermediate network 1820. Intermediate network 1820 can be one of, or a combination of more than one of, a public, private or hosted network; intermediate network 1820, if any, can be a backbone network or the Internet; in particular, intermediate network 1820 can comprise two or more sub-networks (not shown).

The communication system of FIG. 18 as a whole enables connectivity between the connected UEs 1891, 1892 and host computer 1830. The connectivity can be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 can be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which can have storage and/or processing capabilities. In particular, processing circuitry 1918 can comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 can be operable to provide a service to a remote user, such as UE 1930 connecting via OTT connection 1950 terminating at UE 1930 and host computer 1910. In providing the service to the remote user, host application 1912 can provide user data which is transmitted using OTT connection 1950.

Communication system 1900 can also include base station 1920 provided in a telecommunication system and comprising hardware 1925 enabling it to communicate with host computer 1910 and with UE 1930. Hardware 1925 can include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 can be configured to facilitate connection 1960 to host computer 1910. Connection 1960 can be direct, or it can pass through a core network (not shown in FIG. 19) of the telecommunication system and/or through one or more intermediate networks outside the telecommunication system. In the embodiment shown, hardware 1925 of base station 1920 can also include processing circuitry 1928, which can comprise one or more programmable processors, application-specific integrated circuits, field programmable gate arrays or combinations of these (not shown) adapted to execute instructions.

Base station 1920 also includes software 1921 stored internally or accessible via an external connection. For example, software 1921 can include program instructions (also referred to as a computer program product) that, when executed by processing circuitry 1928, can configure base station 1920 to perform operations corresponding to various exemplary methods (e.g., procedures) described herein.

Communication system 1900 can also include UE 1930 already referred to, whose hardware 1935 can include radio interface 1937 configured to set up and maintain wireless connection 1970 with a base station serving a coverage area in which UE 1930 is currently located. Hardware 1935 of UE 1930 can also include processing circuitry 1938, which can comprise one or more programmable processors, application-specific integrated circuits, field programmable gate arrays or combinations of these (not shown) adapted to execute instructions.

UE 1930 also includes software 1931, which is stored in or accessible by UE 1930 and executable by processing circuitry 1938. Software 1931 includes client application 1932. Client application 1932 can be operable to provide a service to a human or non-human user via UE 1930, with the support of host computer 1910. In host computer 1910, an executing host application 1912 can communicate with the executing client application 1932 via OTT connection 1950 terminating at UE 1930 and host computer 1910. In providing the service to the user, client application 1932 can receive request data from host application 1912 and provide user data in response to the request data. OTT connection 1950 can transfer both the request data and the user data. Client application 1932 can interact with the user to generate the user data that it provides. Software 1931 can also include program instructions (also referred to as a computer program product) that, when executed by processing circuitry 1938, can configure UE 1930 to perform operations corresponding to various exemplary methods (e.g., procedures) described herein.

Figure 19:
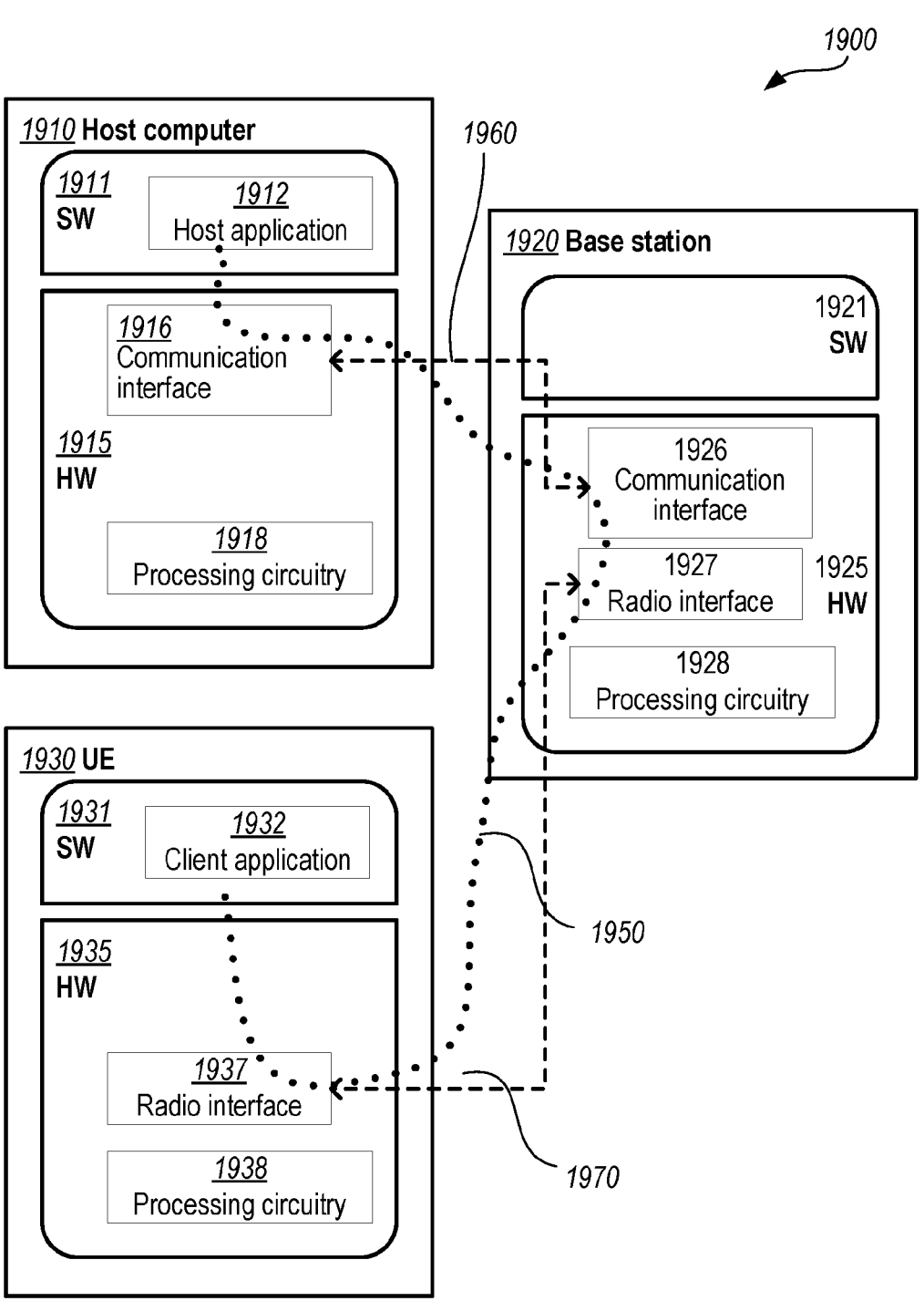

As an example, host computer 1910, base station 1920 and UE 1930 illustrated in FIG. 19 can be similar or identical to host computer 1830, one of base stations 1812*a-c* and one of UEs 1891-1892 of FIG. 18, respectively. This is to say, the inner workings of these entities can be as shown in FIG. 19 and independently, the surrounding network topology can be that shown in FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure can determine the routing, which it can be configured to hide from UE 1930 or from the service provider operating host computer 1910, or both. While OTT connection 1950 is active, the network infrastructure can further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1950 between host computer 1910 and UE 1930, in response to variations in the measurement results. The measurement procedure and/or the network functionality for reconfiguring OTT connection 1950 can be implemented in software 1911 and hardware 1915 of host computer 1910 or in software 1931 and hardware 1935 of UE 1930, or both. In embodiments, sensors (not shown) can be deployed in or in association with communication devices through which OTT connection 1950 passes; the sensors can participate in the measurement procedure by supplying values of the monitored quantities exemplified above, or supplying values of other physical quantities from which software 1911, 1931 can compute or estimate the monitored quantities. The reconfiguring of OTT connection 1950 can include message format, retransmission settings, preferred routing etc.; the reconfiguring need not affect base station 1920, and it can be unknown or imperceptible to base station 1920. Such procedures and functionalities can be known and practiced in the art. In certain embodiments, measurements can involve proprietary UE signaling facilitating host computer 1910's measurements of throughput, propagation times, latency and the like. The measurements can be implemented in that software 1911 and 1931 causes messages to be transmitted, in particular empty or 'dummy' messages, using OTT connection 1950 while it monitors propagation times, errors, etc.

FIG. 20 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 20 will be included in this section. In step 2010, the host computer provides user data. In sub step 2011 (which can be optional) of step 2010, the host computer provides the user data by executing a host application. In step 2020, the host computer initiates a transmission carrying the user data to the UE. In step 2030 (which can be optional), the base station transmits to the UE the user data which was carried in the transmission that the host computer initiated, in accordance with the teachings of the embodiments described throughout this disclosure. In step 2040 (which can also be optional), the UE executes a client application associated with the host application executed by the host computer.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 of the method, the host computer provides user data. In an optional sub step (not shown) the host computer provides the user data by executing a host application. In step 2120, the host computer initiates a transmission carrying the user data to the UE. The transmission can pass via the base station, in accordance with the teachings of the embodiments described throughout this disclosure. In step 2130 (which can be optional), the UE receives the user data carried in the transmission.

FIG. 22 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 22 will be included in this section. In step 2210 (which can be optional), the UE receives input data provided by the host computer. Additionally or alternatively, in step 2220, the UE provides user data. In substep 2221 (which can be optional) of step 2220, the UE provides the user data by executing a client application. In substep 2211 (which can be optional) of step 2210, the UE executes a client application which provides the user data in reaction to the received input data provided by the host computer. In providing the user data, the executed client application can further consider user input received from the user. Regardless of the specific manner in which the user data was provided, the UE initiates, in substep 2230 (which can be optional), transmission of the user data to the host computer. In step 2240 of the method, the host computer receives the user data transmitted from the UE, in accordance with the teachings of the embodiments described throughout this disclosure.

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 (which can be optional), in accordance with the teachings of the embodiments described throughout this disclosure, the base station receives user data from the UE. In step 2320 (which can be optional), the base station initiates transmission of the received user data to the host computer. In step 2330 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated embodiments:

A1. A method for an authentication server function (AUSF) of a communication network, the method comprising:

receiving, from a user equipment (UE), an authentication request that includes either a first identifier associated with the UE or a second identifier associated with the UE; and when the authentication request includes the second identifier, determining one of the following security key identifiers:

a first security key identifier based on a first field, of the first identifier, that is obtained from a unified data management function (UDM) of the communication network; or a second security key identifier that is not based on a first field of the first identifier.

A2. The method of embodiment A1, further comprising performing the following operations when the authentication request includes the first identifier:

determining the first security key identifier based on a first field included in the first identifier; and sending, to the UDM, the first field included in the first identifier.

A3. The method of any of embodiments A1-A2, wherein:

the second identifier is a 5G Global Unique Temporary Identifier (5G-GUTI);

the first identifier is a subscription concealed identifier (SUCI);

the first field is a Routing Indicator (RID) associated with a home network of the UE;

the first security key identifier is an authentication and key management for applications (AKMA) key identifier (A-KID); and the second security key identifier is an AKMA Temporary UE Identifier (A-TID).

A4. The method of any of embodiments A1-A3, wherein determining the first security key identifier based on the first field obtained from the UDM comprises:

determining a third identifier associated with the UE based on the second identifier;

sending, to the UDM, an authentication request that includes the third identifier; and receiving the first field from the UDM in response to the authentication request.

A5. The method of embodiment A4, wherein the authentication request includes an explicit request for the first field.

A6. The method of any of embodiments A4-A5, wherein the third identifier is a subscription permanent identifier (SUPI).

A7. The method of any of embodiments A1-A7, further comprising:

deriving an anchor key ($K_{AKMA}$) for the UE; and sending, to an anchor function for authentication and key management for applications (AAnF) of the communication network, a message including the anchor key ($K_{AKMA}$) and the determined security key identifier.

A8. The method of embodiment A7, wherein the message includes an indication of whether the included security key identifier is the first security key identifier or the second security key identifier.

A9. The method of any of embodiments A1-A8, wherein determining the second security key identifier is further based on a determination that the first field of the first identifier associated with the UE is unavailable to the AUSF.

B1. A method for a unified data management function (UDM) of a communication network, the method comprising:

receiving, from an authentication server function (AUSF) of the communication network, an authentication request for a user equipment (UE) that includes either a first identifier associated with the UE or a second identifier associated with the UE;

when the authentication request includes the second identifier, obtaining a first field of the first identifier and sending the first field to the AUSF in response to the authentication request; and when the authentication request includes the first identifier, storing the first field included in the first identifier.

B2. The method of embodiment B1, wherein obtaining the first field comprises one of the following:

retrieving a stored version of the first field from UE subscription data or from a previous successful authentication of the UE; or performing a de-concealment operation on the second identifier to generate the first identifier, including the first field.

B3. The method of any of embodiments B1-B2, wherein sending the first field to the AUSF is responsive to one of the following:

an explicit request for the first field, included in the authentication request; or inclusion of an authentication and key management for applications (AKMA) indicator in the response to the authentication request.

B4. The method of any of embodiments B1-B3, wherein:

the second identifier is a subscription permanent identifier (SUPI);

the first identifier is a subscription concealed identifier (SUCI); and the first field is a Routing Indicator (RID) associated with a home network of the UE.

C1. A method for an anchor function for authentication and key management for applications (AAnF) of a communication network, the method comprising:

receiving, from an authentication server function (AUSF) of the communication network, an anchor key (KA) for a user equipment (UE) together with one of the following security key identifiers:

a first security key identifier based on a first field of a first identifier associated with the UE; or a second security key identifier that is not based on the first field;

storing the anchor key ($K_{AKMA}$) in association with received security key identifier;

receiving, from an application function (AF) associated with the communication network, a request for a security key ($K_{AF}$) associated with an application session between the AF and the UE, wherein the request includes a third security key identifier associated with the UE; and based on determining that the third security key identifier corresponds to the stored security key identifier, deriving the security key ($K_{AF}$) associated with the application session based on the anchor key ($K_{AKMA}$) stored in association with the received security key identifier.

C2. The method of embodiment C1, further comprising sending the derived security key ($K_{AF}$) to the AF.

C3. The method of any of embodiments C1-C2, wherein:

the second identifier is a subscription permanent identifier (SUPI);

the first identifier is a subscription concealed identifier (SUCI);

the first field is a Routing Indicator (RID) associated with a home network of the UE;

the first security key identifier is an authentication and key management for applications (AKMA) key identifier (A-KID); and the second security key identifier is an AKMA Temporary UE Identifier (A-TID).

C4. The method of any of embodiments C1-C3, wherein when the anchor key (KALA) is stored in association with the second security key identifier, determining that the third security key identifier corresponds to the stored security key identifier further comprises:

determining a fourth security key identifier from the received third security key identifier; and determining a match between the fourth security key identifier and the second security key identifier.

C5. The method of embodiment C4, wherein:

the third security key identifier is an authentication and key management for applications (AKMA) key identifier (A-KID); and the fourth security key identifier is an AKMA Temporary UE Identifier (A-TID).

D1. An authentication server function (AUSF) of a communication network, the AUSF comprising:

interface circuitry configured to communicate with a user equipment (UE) and with an anchor function for authentication and key management for applications (AAnF) and a unified data management function (UDM) of the communication network; and processing circuitry operably coupled to the interface circuitry, whereby the processing circuitry and interface circuitry are configured to perform operations corresponding to any of the methods of embodiments A1-A9.

D2. An authentication server function (AUSF) of a communication network, the AUSF being configured to perform operations corresponding to any of the methods of embodiments A1-A9.

D3. A non-transitory, computer-readable medium storing computer-executable instructions that, when executed by processing circuitry associated with an authentication server function (AUSF) of a communication network, configure the AUSF to perform operations corresponding to any of the methods of embodiments A1-A9.

D4. A computer program product comprising computer-executable instructions that, when executed by processing circuitry associated with an authentication server function (AUSF) of a communication network, configure the AUSF to perform operations corresponding to any of the methods of embodiments A1-A9.

E1. A unified data management function (UDM) of a communication network, the UDM comprising:
    interface circuitry configured to communicate with an authentication server function (AUSF) of the communication network; and
    processing circuitry operably coupled to the interface circuitry, whereby the processing circuitry and interface circuitry are configured to perform operations corresponding to any of the methods of embodiments B1-B4.

E2. A unified data management function (UDM) of a communication network, the UDM being configured to perform operations corresponding to any of the methods of embodiments B1-B4.

E3. A non-transitory, computer-readable medium storing computer-executable instructions that, when executed by processing circuitry associated with a unified data management function (UDM) of a communication network, configure the UDM to perform operations corresponding to any of the methods of embodiments B1-B4.

E4. A computer program product comprising computer-executable instructions that, when executed by processing circuitry associated with a unified data management function (UDM) of a communication network, configure the UDM to perform operations corresponding to any of the methods of embodiments B1-B4.

F1. An anchor function for authentication and key management for applications (AAnF) of a communication network, the AAnF comprising:
    interface circuitry configured to communicate with a user equipment (UE) and with an authentication server function (AUSF) of the communication network; and
    processing circuitry operably coupled to the interface circuitry, whereby the processing circuitry and interface circuitry are configured to perform operations corresponding to any of the methods of embodiments C1-C5.

F2. An anchor function for authentication and key management for applications (AAnF) in a communication network, the AAnF being configured to perform operations corresponding to any of the methods of embodiments C1-C5.

F3. A non-transitory, computer-readable medium storing computer-executable instructions that, when executed by processing circuitry associated with an anchor function for authentication and key management for applications (AAnF) in a communication network, configure the AAnF to perform operations corresponding to any of the methods of embodiments C1-C5.

F4. A computer program product comprising computer-executable instructions that, when executed by processing circuitry associated with an anchor function for authentication and key management for applications (AAnF) in a communication network, configure the AAnF to perform operations corresponding to any of the methods of embodiments C1-C5.

The invention claimed is:

1. A method performed by an authentication server function, AUSF, of a communication network, the method comprising:
    sending an authentication request comprising a subscription permanent identifier, SUPI, of a user equipment, UE;
    receiving a response to the authentication request, the response comprising an authentication and key management for applications, AKMA, indicator and a routing indicator associated with a home network of the UE; and
    responsive to the AKMA indicator comprised in the response:
        determining an anchor key, $K_{AKMA}$, for AKMA key material generation; and
        determining a key identifier, A-KID, of the anchor key, $K_{AKMA}$, based on the routing indicator associated with the home network of the UE comprised in the response.

2. The method according to claim 1, further comprising:
    sending, to an anchor function for authentication and key management for applications, AAnF, a message including the anchor key, $K_{AKMA}$, and the key identifier, A-KID.

3. The method according to claim 2, wherein the message further includes the SUPI of the UE.

4. The method according to claim 1, wherein the authentication request is sent to a unified data management function, UDM, of the communication network, and wherein the response to the authentication request is received from the UDM.

5. A method performed by a unified data management function, UDM, of a communication network, the method comprising:
    receiving, from an authentication server function, AUSF, of the communication network, an authentication request for a user equipment, UE, that includes a subscription permanent identifier, SUPI, of the UE;
    obtaining a routing indicator associated with a home network of the UE; and
    sending an authentication and key management for applications, AKMA, indicator and the routing indicator associated with the home network of the UE to the AUSF in response to the authentication request.

6. The method according to claim 5, wherein obtaining the routing indicator associated with the home network of the UE comprises one of the following:
    retrieving a stored version of the routing indicator associated with the home network of the UE from UE subscription data or from a previous successful authentication of the UE; or
    performing a de-concealment operation on the SUPI of the UE to generate a subscription concealed identifier, SUCI, of the UE, the SUCI of the UE comprising the routing indicator associated with the home network of the UE.

7. A network node for implementing an authentication server function, AUSF, of a communication network, the network node comprising:
    processing circuitry configured to cause the network node to:
        send an authentication request comprising a subscription permanent identifier, SUPI, of a user equipment, UE;
        receive a response to the authentication request, the response comprising an authentication and key management for applications, AKMA, indicator and a routing indicator associated with a home network of the UE; and responsive to the response to the AKMA indicator comprised in the response:

determine an anchor key, KAKMA, for AKMA key material generation; and determine a key identifier, A-KID, of the anchor key, $K_{AKMA}$, based on the routing indicator associated with the home network of the UE comprised in the response.

8. The network node for implementing the AUSF according to claim 7, wherein the processing circuitry is further configured to cause the network node to:

send, to an anchor function for authentication and key management for applications, AAnF, a message including the anchor key, KAKMA, and the key identifier, A-KID.

9. The network node for implementing the AUSF according to claim 8, wherein the message further includes the SUPI of the UE.

10. The network node for implementing the AUSF according to claim 7, wherein the authentication request is sent to a unified data management function, UDM, of the communication network, and wherein the response to the second authentication request is received from the UDM.

11. A network node for implementing a unified data management function, UDM, of a communication network, the network node comprising:

processing circuitry configured to cause the network node to:

receive, from an authentication server function, AUSF, of the communication network, an authentication request for a user equipment, UE, that includes a subscription permanent identifier, SUPI, of the UE;

obtain a routing indicator associated with a home network of the UE; and send an authentication and key management for applications, AKMA, indicator and the routing indicator associated with the home network of the UE to the AUSF in response to the authentication request.

12. The network node for implementing the UDM of claim 11, wherein obtaining the routing indicator associated with the home network of the UE comprises one of the following:

retrieving a stored version of the routing indicator associated with the home network of the UE from UE subscription data or from a previous successful authentication of the UE; or performing a de-concealment operation on the SUPI of the UE to generate a subscription concealed identifier, SUCI, of the UE, the SUCI of the UE comprising the routing indicator associated with the home network of the UE.

* * * * *